(12) United States Patent
Gude et al.

(10) Patent No.: US 10,135,727 B2
(45) Date of Patent: Nov. 20, 2018

(54) ADDRESS GROUPING FOR DISTRIBUTED SERVICE RULES

(71) Applicant: Nicira, Inc., Palo Alto, CA (US)

(72) Inventors: Natasha Gude, San Francisco, CA (US); Soner Sevinc, San Francisco, CA (US); Igor Ganichev, Mountain View, CA (US); Anuprem Chalvadi, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 83 days.

(21) Appl. No.: 15/143,477

(22) Filed: Apr. 29, 2016

(65) Prior Publication Data
US 2017/0317928 A1    Nov. 2, 2017

(51) Int. Cl.
| | |
|---|---|
| H04L 12/46 | (2006.01) |
| H04L 29/12 | (2006.01) |
| H04L 12/721 | (2013.01) |
| H04L 12/771 | (2013.01) |
| H04L 29/08 | (2006.01) |
| H04L 29/06 | (2006.01) |

(52) U.S. Cl.
CPC ............. *H04L 45/72* (2013.01); *H04L 45/56* (2013.01)

(58) Field of Classification Search
USPC .......................... 709/238, 204, 223, 245, 226
See application file for complete search history.

(56) References Cited

U.S. PATENT DOCUMENTS

| | | | |
|---|---|---|---|
| 5,581,722 A | * | 12/1996 | Welland ............... G06F 12/023 |
| | | | 711/206 |
| 5,968,176 A | | 10/1999 | Nessett et al. |
| 6,154,775 A | | 11/2000 | Coss et al. |
| 6,219,786 B1 | | 4/2001 | Cunningham et al. |
| 6,496,935 B1 | | 12/2002 | Fink et al. |
| 6,600,744 B1 | | 7/2003 | Carr et al. |
| 6,880,089 B1 | | 4/2005 | Bommareddy et al. |
| 7,032,022 B1 | | 4/2006 | Shanumgam et al. |
| 7,055,173 B1 | | 5/2006 | Chaganty et al. |

(Continued)

FOREIGN PATENT DOCUMENTS

| | | |
|---|---|---|
| EP | 2748750 A1 | 7/2014 |
| JP | 2006040274 A | 2/2006 |

(Continued)

OTHER PUBLICATIONS

Author Unknown, "AppLogic Features," Jul. 2007, 2 pages. 3TERA, Inc.

(Continued)

*Primary Examiner* — Jude Jean Gilles
(74) *Attorney, Agent, or Firm* — Adeli LLP

(57) ABSTRACT

Some embodiments provide a method for a network controller that manages a flow-based managed forwarding element (MFE). The method receives multiple service rules for implementation by the MFE. Each service rule matches over a set of network addresses. At least one network address is in the set of network addresses for at least two service rules. The method groups the network addresses into non-overlapping groups of network addresses, each of which addresses that are all matched by only a same set of service rules. The method generates flow entries that match over the groups of network addresses for the MFE to use to implement the service rules.

23 Claims, 15 Drawing Sheets

(56) References Cited

U.S. PATENT DOCUMENTS

| | | | |
|---|---|---|---|
| 7,106,756 B1* | 9/2006 | Donovan | H04L 47/15 370/395.21 |
| 7,349,382 B2 | 3/2008 | Marimuthu et al. | |
| 7,657,887 B2 | 2/2010 | Kothandaraman et al. | |
| 7,676,836 B2 | 3/2010 | Prigent et al. | |
| 7,724,740 B1 | 5/2010 | Wang et al. | |
| 7,818,452 B2 | 10/2010 | Matthews et al. | |
| 7,831,826 B2 | 11/2010 | Koti et al. | |
| 7,894,480 B1 | 2/2011 | Wang et al. | |
| 7,948,986 B1 | 5/2011 | Ghosh et al. | |
| 7,954,143 B2 | 5/2011 | Aaron | |
| 8,032,933 B2 | 10/2011 | Turley et al. | |
| 8,190,767 B1 | 5/2012 | Maufer et al. | |
| 8,365,294 B2 | 1/2013 | Ross | |
| 8,621,552 B1 | 12/2013 | Lotem et al. | |
| 8,660,129 B1 | 2/2014 | Brendel et al. | |
| 8,813,209 B2 | 8/2014 | Bhattacharya et al. | |
| 8,904,511 B1 | 12/2014 | O'neill et al. | |
| 9,015,823 B2 | 4/2015 | Koponen et al. | |
| 9,047,109 B1 | 6/2015 | Wang et al. | |
| 9,130,901 B2 | 9/2015 | Lee | |
| 9,215,210 B2 | 12/2015 | Raman et al. | |
| 9,215,213 B2 | 12/2015 | Bansal et al. | |
| 9,215,214 B2 | 12/2015 | Bansal et al. | |
| 9,276,904 B2 | 3/2016 | Bansal et al. | |
| 9,367,257 B2 | 6/2016 | Hamilton et al. | |
| 9,369,431 B1 | 6/2016 | Kirby et al. | |
| 9,479,464 B1 | 10/2016 | Wang et al. | |
| 9,553,806 B2* | 1/2017 | Anand | H04L 45/00 |
| 9,680,706 B2 | 6/2017 | Masurekar et al. | |
| 9,755,903 B2 | 9/2017 | Masurekar et al. | |
| 9,774,707 B2 | 9/2017 | Parthasarathy et al. | |
| 9,806,948 B2 | 10/2017 | Masurekar et al. | |
| 9,860,279 B2 | 1/2018 | Jain et al. | |
| 9,894,103 B2* | 2/2018 | Kwok | H04L 63/20 |
| 9,906,560 B2* | 2/2018 | Jain | H04L 63/20 |
| 9,906,561 B2* | 2/2018 | Jain | H04L 63/20 |
| 9,906,562 B2* | 2/2018 | Jain | H04L 63/20 |
| 2002/0078370 A1 | 6/2002 | Tahan | |
| 2003/0041266 A1 | 2/2003 | Ke et al. | |
| 2003/0093481 A1 | 5/2003 | Mitchell et al. | |
| 2003/0120955 A1 | 6/2003 | Bartal et al. | |
| 2003/0126468 A1 | 7/2003 | Markham | |
| 2003/0226027 A1 | 12/2003 | Marquet et al. | |
| 2004/0049701 A1 | 3/2004 | Le Pennec et al. | |
| 2004/0177276 A1 | 9/2004 | Mackinnon et al. | |
| 2005/0198125 A1 | 9/2005 | Macleod Beck et al. | |
| 2005/0210291 A1 | 9/2005 | Miyawaki et al. | |
| 2005/0276262 A1 | 12/2005 | Schuba et al. | |
| 2005/0278431 A1 | 12/2005 | Goldschmidt et al. | |
| 2006/0013136 A1 | 1/2006 | Goldschmidt et al. | |
| 2006/0129808 A1 | 6/2006 | Koti et al. | |
| 2006/0195896 A1 | 8/2006 | Fulp et al. | |
| 2007/0028291 A1 | 2/2007 | Brennan et al. | |
| 2007/0061492 A1 | 3/2007 | Van Riel | |
| 2008/0072305 A1 | 3/2008 | Casado et al. | |
| 2008/0082977 A1 | 4/2008 | Araujo et al. | |
| 2008/0115190 A1 | 5/2008 | Aaron | |
| 2008/0148382 A1 | 6/2008 | Bartholomy et al. | |
| 2008/0189769 A1 | 8/2008 | Casado et al. | |
| 2008/0215518 A1 | 9/2008 | Matsuda | |
| 2008/0267177 A1 | 10/2008 | Johnson et al. | |
| 2008/0289028 A1 | 11/2008 | Jansen et al. | |
| 2008/0298274 A1 | 12/2008 | Takashige et al. | |
| 2009/0007219 A1 | 1/2009 | Abzarian et al. | |
| 2009/0007251 A1 | 1/2009 | Abzarian et al. | |
| 2009/0129271 A1 | 5/2009 | Ramankutty et al. | |
| 2009/0150521 A1 | 6/2009 | Tripathi | |
| 2009/0235325 A1 | 9/2009 | Dimitrakos et al. | |
| 2009/0249436 A1 | 10/2009 | Coles et al. | |
| 2009/0249438 A1 | 10/2009 | Litvin et al. | |
| 2009/0249470 A1 | 10/2009 | Litvin et al. | |
| 2009/0249472 A1 | 10/2009 | Litvin et al. | |
| 2009/0276771 A1 | 11/2009 | Nickolov et al. | |
| 2009/0327198 A1 | 12/2009 | Farah | |
| 2009/0327781 A1 | 12/2009 | Tripathi | |
| 2010/0037310 A1 | 2/2010 | Turley et al. | |
| 2010/0037311 A1 | 2/2010 | He et al. | |
| 2010/0037331 A1 | 2/2010 | Blake et al. | |
| 2010/0043067 A1 | 2/2010 | Varadhan et al. | |
| 2010/0100616 A1 | 4/2010 | Bryson et al. | |
| 2010/0100949 A1 | 4/2010 | Sonwane et al. | |
| 2010/0125667 A1 | 5/2010 | Soundararajan | |
| 2011/0016467 A1 | 1/2011 | Kane | |
| 2011/0022695 A1 | 1/2011 | Dalal et al. | |
| 2011/0055916 A1 | 3/2011 | Ahn | |
| 2011/0072486 A1 | 3/2011 | Hadar et al. | |
| 2011/0103259 A1 | 5/2011 | Aybay et al. | |
| 2011/0113467 A1 | 5/2011 | Agarwal et al. | |
| 2011/0213875 A1 | 9/2011 | Ferris et al. | |
| 2011/0246637 A1 | 10/2011 | Murakami | |
| 2011/0302647 A1 | 12/2011 | Bhattacharya et al. | |
| 2012/0042033 A1 | 2/2012 | Ayala, Jr. et al. | |
| 2012/0137199 A1 | 5/2012 | Liu | |
| 2012/0180104 A1* | 7/2012 | Gronich | H04L 63/20 726/1 |
| 2012/0240182 A1 | 9/2012 | Narayanaswamy et al. | |
| 2012/0263049 A1 | 10/2012 | Venkatachalapathy et al. | |
| 2012/0291024 A1 | 11/2012 | Barabash et al. | |
| 2012/0314617 A1 | 12/2012 | Erichsen et al. | |
| 2013/0007740 A1 | 1/2013 | Kikuchi et al. | |
| 2013/0019277 A1 | 1/2013 | Chang et al. | |
| 2013/0031544 A1 | 1/2013 | Sridharan et al. | |
| 2013/0047151 A1 | 2/2013 | Sridharan et al. | |
| 2013/0073743 A1 | 3/2013 | Ramasamy et al. | |
| 2013/0074066 A1 | 3/2013 | Sanzgiri et al. | |
| 2013/0125230 A1 | 5/2013 | Koponen et al. | |
| 2013/0163594 A1 | 6/2013 | Sharma et al. | |
| 2013/0198355 A1 | 8/2013 | Kalyanaraman et al. | |
| 2013/0219384 A1 | 8/2013 | Srinivasan et al. | |
| 2013/0227097 A1 | 8/2013 | Yasuda et al. | |
| 2013/0227550 A1 | 8/2013 | Weinstein et al. | |
| 2013/0311358 A1 | 11/2013 | Sethi et al. | |
| 2013/0311612 A1 | 11/2013 | Dickinson | |
| 2013/0332983 A1 | 12/2013 | Koorevaar et al. | |
| 2014/0068602 A1 | 3/2014 | Gember et al. | |
| 2014/0108319 A1 | 4/2014 | Klauser et al. | |
| 2014/0115578 A1 | 4/2014 | Cooper et al. | |
| 2014/0149794 A1 | 5/2014 | Shetty et al. | |
| 2014/0195666 A1 | 7/2014 | Dumitriu et al. | |
| 2014/0245423 A1 | 8/2014 | Lee | |
| 2014/0281030 A1 | 9/2014 | Cui et al. | |
| 2014/0282855 A1 | 9/2014 | Clark et al. | |
| 2014/0282889 A1 | 9/2014 | Ishaya et al. | |
| 2014/0297780 A1 | 10/2014 | Zhou et al. | |
| 2014/0325037 A1 | 10/2014 | Elisha | |
| 2015/0052521 A1 | 2/2015 | Raghu | |
| 2015/0112933 A1 | 4/2015 | Satapathy | |
| 2015/0193466 A1 | 7/2015 | Luft | |
| 2015/0200816 A1 | 7/2015 | Yung et al. | |
| 2015/0229641 A1 | 8/2015 | Sun et al. | |
| 2015/0277949 A1 | 10/2015 | Loh et al. | |
| 2016/0050117 A1 | 2/2016 | Voellmy et al. | |
| 2016/0094456 A1* | 3/2016 | Jain | H04L 41/0813 370/235 |
| 2016/0094643 A1 | 3/2016 | Jain et al. | |
| 2016/0105333 A1 | 4/2016 | Lenglet et al. | |
| 2016/0112374 A1 | 4/2016 | Branca | |
| 2016/0149863 A1 | 5/2016 | Walker et al. | |
| 2016/0156591 A1 | 6/2016 | Zhou et al. | |
| 2016/0182454 A1 | 6/2016 | Phonsa et al. | |
| 2016/0191466 A1 | 6/2016 | Pernicha | |
| 2016/0191570 A1 | 6/2016 | Bansal et al. | |
| 2016/0241702 A1 | 8/2016 | Gorajala Chandra et al. | |
| 2017/0004192 A1 | 1/2017 | Masurekar et al. | |
| 2017/0005867 A1 | 1/2017 | Masurekar et al. | |
| 2017/0005987 A1 | 1/2017 | Masurekar et al. | |
| 2017/0005988 A1 | 1/2017 | Bansal et al. | |
| 2017/0026283 A1 | 1/2017 | Williams et al. | |
| 2017/0064749 A1* | 3/2017 | Jain | H04L 61/256 |
| 2017/0104720 A1 | 4/2017 | Bansal et al. | |
| 2017/0180319 A1* | 6/2017 | Nimmagadda | H04L 63/0263 |
| 2017/0180320 A1* | 6/2017 | Nimmagadda | H04L 63/0263 |
| 2017/0180321 A1* | 6/2017 | Nimmagadda | H04L 63/0263 |

(56) References Cited

U.S. PATENT DOCUMENTS

| | | | |
|---|---|---|---|
| 2017/0180423 A1* | 6/2017 | Nimmagadda | H04L 63/20 |
| 2017/0187679 A1 | 6/2017 | Basak et al. | |
| 2017/0250869 A1 | 8/2017 | Voellmy | |
| 2017/0317976 A1 | 11/2017 | Chalvadi et al. | |
| 2017/0317977 A1 | 11/2017 | Popuri et al. | |
| 2017/0317979 A1 | 11/2017 | Bansal et al. | |
| 2017/0318055 A1 | 11/2017 | Popuri et al. | |
| 2018/0007000 A1 | 1/2018 | Bansal et al. | |
| 2018/0007007 A1 | 1/2018 | Bansal et al. | |
| 2018/0007008 A1 | 1/2018 | Bansal et al. | |

FOREIGN PATENT DOCUMENTS

| | | |
|---|---|---|
| WO | 2008095010 A1 | 8/2008 |
| WO | 2013074828 A1 | 5/2013 |

OTHER PUBLICATIONS

Author Unknown, "CISCO Identity-Based Firewall Security," Month Unknown, 2011, 2 pages, CISCO Systems, Inc.

Author Unknown, "Enabling Service Chaining on Cisco Nexus 1000V Series," Month Unknown, 2012, 25 pages, CISCO.

Author Unknown, "Next-Generation Firewalls," Oct. 1, 2013, 1 page, Palo Alto Networks.

Basak, Debashis, et al., "Virtualizing Networking and Security in the Cloud," Month Unknown, 2010, 9 pages, VMware.com.

Casado, Martin, et al., "SANE: A Protection Architecture for Enterprise Networks," Proceedings of the 15th USENIX Security Symposium, Jul. 31, 2006, 15 pages.

Dixon, Colin, et al., "An End to the Middle," Proceedings of the 12th conference on Hot topics in operating systems USENIX Association, May 2009, 5 pages, Berkeley, CA, USA.

Dumitriu, Dan Mihai, et al., U.S. Appl. No. 61/514,990, filed Aug. 4, 2011.

Guichard, J., et al., "Network Service Chaining Problem Statement; draft-quinn-nsc-probiem-statement-00.txt," Jun. 13, 2013, 14 pages, Cisco Systems, Inc.

Ioannidis, Sotiris, et al., "Implementing a Distributed Firewall," CCS'00, Month Unknown, 2000, 10 pages, ACM, Athens, Greece.

Joseph, Dilip Antony, et al., "A Policy-aware Switching Layer for Data Centers," Jun. 24, 2008, 26 pages, Electrical Engineering and Computer Sciences, University of California, Berkeley, CA, USA.

Mayer, Alain, et al., "Offline Firewall Analysis," Int. L. Inf. Secur. (2006) 5(3), Jun. 16, 2005, 20 pages, Springer-Verlag.

Scarfone, Karen, et al., "Guidelines on Firewalls and Firewall Policy," Sep. 2009, 48 pages, NIST, U.S. Department of Commerce.

Sekar, Vyas, at al., "Design and Implementation of a Consolidated Middlebox Architecture," In Proc. of NSDI, Month Unknown, 2012, 14 pages.

Sherry, Justine, et al., "Making Middleboxes Someone Else's Problem: Network Processing as a Cloud Service," In Proc. of SIGCOMM, Aug. 13-17, 2012, 12 pages, Helsinki, Finland.

Stojanovski, Nenad, et al., "Architecture of a Identity Based Firewall System," Jul. 2011, 9 pages.

Stojanovski, Nenad, et al., "Analysis of Identity Based Firewall Systems," Jun. 2010, 9 pages.

Thames, J. Lane, et al., "A Distributed Firewall and Active Response Architecture Providing Preemptive Protection," ACM-SE'08, Mar. 28-29, 2008, 6 pages, Auburn, AL, USA.

* cited by examiner

Stage = 1, src_mac = A; actions groupID = 1, stage = 2; priority 2
Stage = 1, src_mac = B; actions groupID = 2, stage = 2; priority 2
Stage = 1, src_mac = C; actions groupID = 2, stage = 2; priority 2
Stage = 1, src_mac = D; actions groupID = 2, stage = 2; priority 2
Stage = 1, src_mac = E; actions groupID = 3, stage = 2; priority 2
Stage = 1, src_mac = F; actions groupID = 4, stage = 2; priority 2 } 1315
Stage = 1, src_mac = G; actions groupID = 3, stage = 2; priority 2
Stage = 1, src_mac = H; actions groupID = 5, stage = 2; priority 2
Stage = 1, src_mac = I; actions groupID = 5, stage = 2; priority 2
Stage = 1, src_mac = J; actions groupID = 5, stage = 2; priority 2
Stage = 1 actions stage = 6; priority = 64000

Stage = 2, groupID = 1; actions conj(1, 1/4), stage = 3; priority 1
Stage = 2, groupID = 1; actions conj(2, 1/4), stage = 3; priority 2
Stage = 2, groupID = 1; actions conj(5, 1/4), stage = 3; priority 5
Stage = 2, groupID = 1; actions conj(7, 1/4), stage = 3; priority 7
Stage = 2, groupID = 2; actions conj(1, 1/4), stage = 3; priority 1
Stage = 2, groupID = 2; actions conj(3, 1/4), stage = 3; priority 3
Stage = 2, groupID = 2; actions conj(5, 1/4), stage = 3; priority 5
Stage = 2, groupID = 3; actions conj(2, 1/4), stage = 3; priority 2 } 1400
Stage = 2, groupID = 3; actions conj(5, 1/4), stage = 3; priority 5
Stage = 2, groupID = 4; actions conj(2, 1/4), stage = 3; priority 2
Stage = 2, groupID = 4; actions conj(4, 1/4), stage = 3; priority 4
Stage = 2, groupID = 5; actions conj(4, 1/4), stage = 3; priority 4
Stage = 2, groupID = 5; actions conj(6, 1/4), stage = 3; priority 6
Stage = 2, groupID = 5; actions conj(7, 1/4), stage = 3; priority 7

....

Stage = 6, conj_ID = 1; actions A1; priority 1
Stage = 6, conj_ID = 2; actions A2; priority 2
Stage = 6, conj_ID = 3; actions A3; priority 3
Stage = 6, conj_ID = 4; actions A4; priority 4 } 1325
Stage = 6, conj_ID = 5; actions A5; priority 5
Stage = 6, conj_ID = 6; actions A6; priority 6
Stage = 6, conj_ID = 7; actions A7; priority 7
Stage = 6; actions stage = 7; priority 64000

*Figure 14*

ADDRESS GROUPING FOR DISTRIBUTED SERVICE RULES

BACKGROUND

In computing, a firewall is a network security system that monitors and controls the incoming and outgoing network traffic based on predetermined security rules. A firewall often establishes a barrier between a trusted, secure network and external networks that are assumed not to be secure or trusted. Firewalls may be programmed with many rules specifying which packets to allow or drop.

A tenant in a software defined data center with virtualized network may also want firewall services, which could be implemented in a distributed manner. Doing so requires the implementation of many firewall rules throughout the network in an efficient manner. As such, various optimizations are required to provide such firewall rules efficiently.

BRIEF SUMMARY

Some embodiments provide a method for generating configuration data for a flow-based managed forwarding element (MFE) in order for the MFE to implement distributed service rules (e.g., distributed firewall rules). Specifically, in some embodiments a network controller (operating, e.g., on the same physical machine as the MFE) receives the distributed service rules, assigns priorities to the rules, and generates configuration data (e.g., flow entries) for the rules in an optimized manner. Optimizing the configuration data, in some embodiments, entails identifying non-overlapping sets of addresses that are treated similarly by the rules and generating the configuration data in terms of these non-overlapping address sets rather than the address sets for which the rules are written. This enables the network controller to minimize the number of flow entries that it pushes to the MFE to implement the distributed service rules.

In some embodiments, when the network controller receives the service rules, the rules are organized in sets based on different characteristics. For instance, in some embodiments the network administrator that defines the service rules also defines how the rules are organized. As examples, the rules might be organized with all layer 2 (L2) rules in a first set and all layer 3 (L3) rules in a second set, or with separate sets for each logical L2 switch and each logical L3 router. Other forms of organization, such as all http-related rules in one set and all ssh-related rules in another set, may be used as well.

The sets of service rules as received are organized with priorities, from a highest-priority service rule set to a lowest-priority service rule set. In addition, within each service rule set, the service rules themselves are organized from a highest-priority service rule to a lowest-priority service rule. To accommodate the structure of the MFEs of some embodiments, the network controller flattens these rules into a single list from a highest-priority service rule to a lowest-priority service rule. The network controller of some embodiments starts with the highest-priority service rule set, and assigns those service rules the highest priorities (in the same order in which the service rules are ordered within the set), then proceeds to the next-highest-priority service rule set and assigns those service rules the next highest priorities (again in the same order in which the service rules are ordered within the set), and so on through the lowest-priority service rule set, with the lowest priority assigned to the lowest-priority service rule in the lowest-priority service rule set.

However, simply flattening the priorities into a single list from 1-N would create substantial churn when new service rules are added. For instance, if the rules were organized from priority 1 (highest-priority rule) to priority 1000 and a new service rule was added between the priority 10 and priority 11 service rules, then the priorities of the service rules from 11-1000 would need to be modified. This would use significant network controller resources, in addition to causing substantial transaction resources and time to change all of the flow entries at the MFE.

Instead, some embodiments assign the priority values in a manner designed to minimize re-assignment of priorities when changes are received to the sets of service rules. This is complicated by the MFEs of some embodiments having a constrained space for priority assignment. For example, some MFEs have a 16-bit allocation for flow entry priority values, and thus the service rules for a particular logical network can have a maximum of 65,536 different priorities. Some embodiments divide the priority space into three contiguous subsets, with the highest and lowest priority values (e.g., the 1000 highest and 1000 lowest) left unassigned initially. Within the middle subset, the network controller spaces the service rules when assigning priority values. For example, if the middle subset has 10000 possible priority values and there are 500 service rules, some embodiments assign every $20^{th}$ priority value to a service rule. Other embodiments use two different spacing values, with a smaller spacing left between service rules within the same rule set and a larger spacing left between the lowest-priority service rule of a first rule set and the highest-priority service rule of the next rule set. This latter option allows for flexibility if rules are added/changed/removed within a rule set, while also providing for additional flexibility if rules are added at the beginning or end of a rule set, or if a completely new rule set is added in between two previously-existing rule sets.

When the network controller receives new service rules (e.g., based on changes made by a network administrator), the network controller identifies the location in the list for the new rules, and assigns priority values while minimizing the number of other rules affected by the change. Thus, in the example above, if a single new rule is added between a first service rule assigned to priority X and a second service rule assigned to priority X+20, then the new rule will be assigned to priority X+10. In a more complicated case, if fifteen new rules are added in between a rule with priority X and a rule with priority X+10, then clearly the priority values for some of the rules will need to be changed. For example, if the rule with a next highest priority than priority X (i.e., lower priority value) is X−10, but the rules with the next lowest priorities after priority X+10 have priorities of X+11, X+12, and X+13, then it will affect fewer rules to move the priority X rule to priority X−6 and fit the new rules between priority X−6 and priority X+10. Some embodiments account for additional factors, such as the number of flow entries used to implement each rule, with a preference for modifying the priorities of rules that have fewer corresponding flow entries.

Once the network controller assigns priority values to the rules, the controller then generates the configuration data for the MFE (e.g., flow entries, for a flow-based MFE). In the MFE of some embodiments, flow entries within a table (or sub-table) have priorities, such that if a packet matches more than one flow entry in a stage, the MFE will execute the actions of the highest-priority matching flow entry on the packet. Some embodiments use a single stage of flow entries for the service rules (i.e., with one flow entry per service rule), while other embodiments use multiple stages of flow entries.

Specifically, in some embodiments, the service rules include matches over multiple parameters (e.g., source network address (e.g., MAC or IP address), destination network address, source transport layer port, and destination transport layer port). While a service rule can match over a single value for each parameter or multiple values for one or more of the parameters, the MFEs of some embodiments can only use flow entries with a single value (or a bitmasked value) for each parameter. Thus, multiple flow entries are required for service rules with multiple possible values for each parameter. As a simple example, a service rule with two possible values for a first parameter and one value for each of the other parameters will require two flow entries.

However, for service rules with large numbers of possible parameter values, this can lead to a massive number of flow entries. If a service rule has five possible source addresses, seven possible destination addresses, fifty possible source ports, and twenty-five possible destination ports, then simply taking the product of these parameters leads to 5*7*50*25=43,750 flow entries for a single service rule (although if the ports are in a contiguous range, then the number can potentially be lessened via bitmasking). To solve this problem, some embodiments use a conjunctive matching technique that matches over each parameter in a separate stage, and stores a conjunction value in a register when each parameter is matched. A last stage matches over this conjunction value if all of the parameters for the service rule were previously matched. In the example above, this would only require 5+7+50+25+1=88 flow entries, a significant savings.

A simple use of the conjunctive match technique is not without its problems, however. When there are many rules with overlapping parameter values, matching on the same set of addresses for many rules can create a large number of flow entries (even for single-dimensional rules that do not require conjunction). For example, if three rules match on the same set of one hundred source addresses, then this could result in 300 flow entries. However, if an initial stage was used to match each address to a separate identifier, then these three rules could each have a single flow entry matching on the separate identifier, for a total of 103 flow entries.

Thus, some embodiments use address set normalization to further simplify the set of flow entries to push to the MFE. Address set normalization, for each of the source and destination address parameters, identifies sets of addresses that are treated the same within all of the service rules, and groups these sets into non-overlapping groups that are each treated the same within the flow entries. For instance, if two source addresses are matched by the same five service rules, then these addresses can be assigned an identifier. Before the packet processing stage for matching source addresses, a packet will be processed through a stage that matches its source address to a group identifier, which the MFE matches over at the source address processing stage rather than matching over the actual addresses.

The network controller receives a group of service rules for implementation by the MFE, with each service rule matching over a set of addresses (actually, this is generally two separate sets, one for source addresses and one for destination addresses). For each of the source and destination addresses, these groups may be partially overlapping. For instance, rule A might match over the set of addresses {K, L, M}, while rule B matches over the set of addresses {K, L, N}. In this case, the network controller would flatten these addresses, then identify three groups of addresses: {K, L} (for both service rules), {M} (for service rule A), and {N} (for service rule B). Thus, the first stage of packet processing relevant to these rules would assign a first group identifier to packets with address K or L, a second group identifier to packets with address M, and a third group identifier to packets with address N. While this example has a small number of addresses and therefore does not provide any significant savings in terms of the number of flow entries, for large groups with significant but imperfect intersections between rules, this address set normalization will provide substantial savings.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 14 illustrates the use of separate flow entries for each rule.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a method for generating configuration data for a flow-based managed forwarding element (MFE) in order for the MFE to implement distributed service rules (e.g., distributed firewall rules). Specifically, in some embodiments a network controller (operating, e.g., on the same physical machine as the MFE) receives the distributed service rules, assigns priorities to the rules, and generates configuration data (e.g., flow entries) for the rules in an optimized manner. Optimizing the configuration data, in some embodiments, entails identifying non-overlapping sets of addresses that are treated similarly by the rules and generating the configuration data in terms of these non-overlapping address sets rather than the address sets for which the rules are written. This enables the network controller to minimize the number of flow entries that it pushes to the MFE to implement the distributed service rules.

Figure 1:
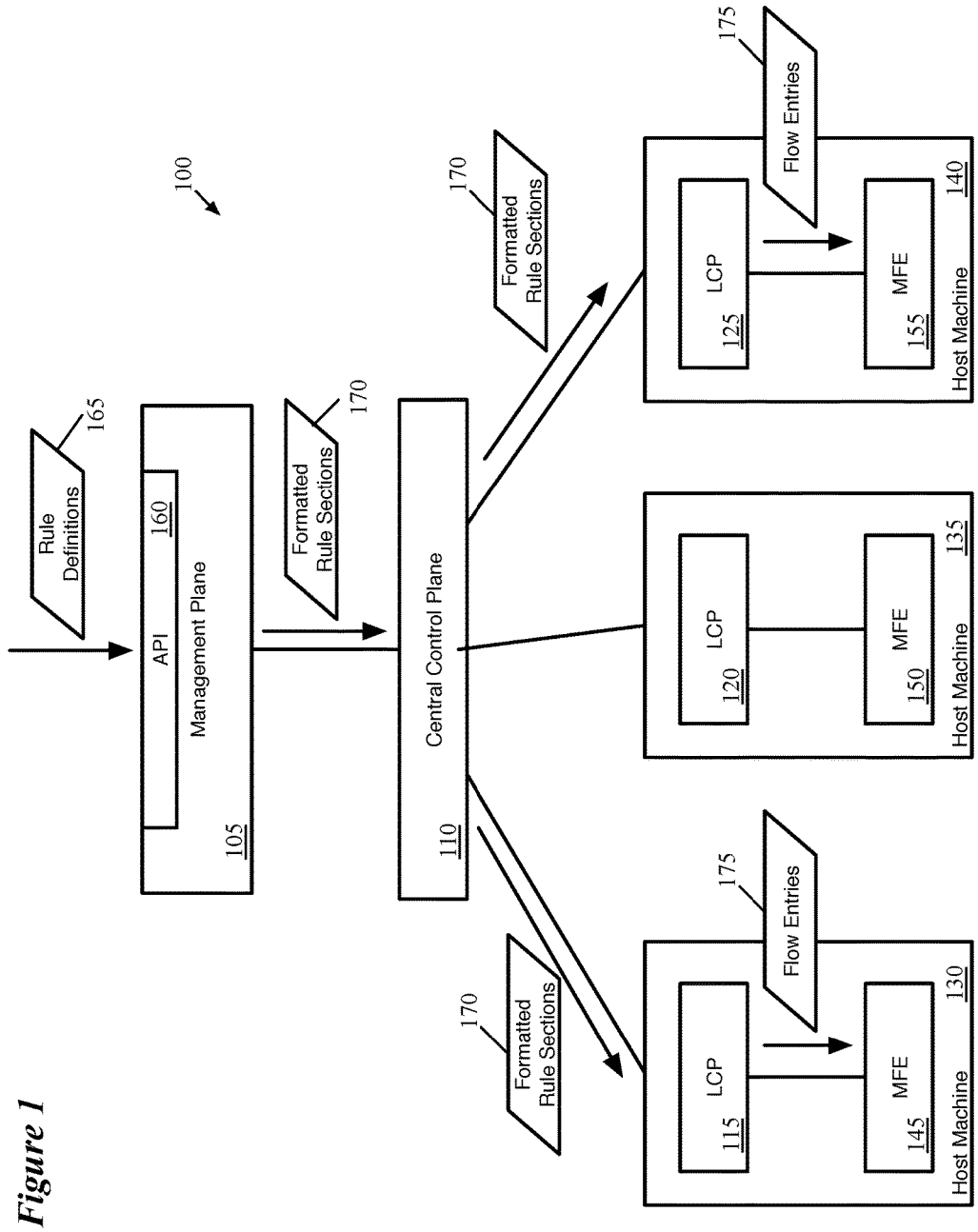
FIG. 1 conceptually illustrates a network control system of some embodiments that includes numerous local network controllers.

FIG. 1 conceptually illustrates a network control system 100 of some embodiments that includes numerous such network controllers. Specifically, as shown, the network control system 100 includes a management plane 105, a central control plane 110, and multiple local controllers (also called the local control plane) 115-125 that operate on host machines 130-140. In addition, each of the host machines 130-140 includes a managed forwarding element (MFE) 145-155 that processes data traffic according to configuration information received from their respective local controllers.

Though shown as single entities, it should be understood that both the management plane 105 and central control plane 110 may be implemented as distributed systems. That is, the management plane 105 may include multiple computers that implement management plane functions, and the central control plane 110 may include multiple controller computers that implement central control plane functions. In some embodiments, each such controller computer includes both management plane and central control plane functions (e.g., as separate applications on the computer).

The management plane 105 of some embodiments is responsible for receiving logical network configuration inputs through an application programming interface (API) 160. Users may input logical network configuration data through, e.g., a command-line interface, a graphical user interface, etc. In some embodiments, the network control system manages MFEs in a datacenter or other physical network that is virtualized, with numerous logical networks (for, e.g., numerous different tenants) all implemented on the same physical infrastructure. Each logical network configuration, in some embodiments, may include configuration data defining one or more logical forwarding elements, such as logical switches, logical routers, etc. This configuration data may include information describing the logical ports (e.g., assigning MAC and/or IP addresses to logical ports) for these logical forwarding elements, how the logical forwarding elements interconnect, etc. In addition, logical network configuration data may include service rule definitions 165, such as distributed firewall rules, for the logical network.

The management plane 105 receives this logical network configuration data and generates desired state data that specifies how the logical network should be implemented in the physical infrastructure. In some embodiments, this data includes descriptions of the logical forwarding elements in a uniform format (e.g., as a set of database records, or a different format). The management plane 105 of some embodiments is responsible for translating API calls (e.g., to create, update, or delete) into modifications to the desired state, and for sending this desired state to the central control plane 110.

As shown in FIG. 1, this desired state data may include formatted rule sections 170 for the service rules. In some embodiments, the service rules are organized in sets based on different characteristics. For instance, in some embodiments the network administrator that defines the service rules also defines how the rules are organized. As examples, the rules might be organized with all layer 2 (L2) rules in a first set and all layer 3 (L3) rules in a second set, or with separate sets for each logical L2 switch and each logical L3 router. Other forms of organization, such as all http-related rules in one set and all ssh-related rules in another set, may be used as well. These sets of service rules (also referred to as rule sections) are organized with priorities, from a highest-priority rule section to a lowest-priority rule section. In addition, within each rule section, the service rules themselves are organized from a highest-priority rule to a lowest-priority rule.

The central control plane 110 of some embodiments receives the desired state and is responsible for pushing that desired state to the appropriate host machines (that will realize this state). In some embodiments, each logical network is implemented on a subset of the physical infrastructure (e.g., a subset of the managed forwarding elements operating on host machines of the physical infrastructure). For example, if virtual machines that connect through a particular logical network reside on five of ten host machines, then some embodiments only implement the logical network on those five host machines. The central control plane sends the state data to local controllers operating on these host machines as needed. As shown in the figure, this includes sending the formatted rule sections 170 to local controllers 115 and 125, but not to the local controller 120. The host machine 135 does not host any VMs that connect to this logical network, and thus its MFE 150 does not need to implement these rules.

The local controllers 115-125 are responsible for translating the formatted rule sections into configuration data formatted for the MFE operating on their respective hosts. In some embodiments, the local controller is a daemon that operates in the virtualization software of the host machine, as does the MFE. In other embodiments, the local controller and MFE may operate within a VM that hosts multiple containers for one or more logical networks. In some such embodiments, a first local controller and MFE operate in the virtualization software on the host machine while a second local controller and MFE operate in the container host VM (or multiple such controllers/MFE operate in multiple container host VMs).

In addition, while in some embodiments all MFEs in the physical infrastructure are of the same type (and thus require data in the same format), in other embodiments the physical infrastructure may include multiple different types of MFEs. For instance, some embodiments include both hosts with kernel virtual machine (KVM) virtualization software with a flow-based MFE (e.g., Open vSwitch) and hosts with ESX virtualization software with a feature-based MFEs. Such different types of MFEs require different data formats from the local controller. In the example of FIG. 1, the local controllers 115 and 125 both manage flow-based MFEs 145 and 155, and thus these local controllers generate flow entries 175 for distribution to the MFEs. These flow entries are generated for the service rule sections 170 in such a way as to (i) minimize the number of flow entries required for what is often a large number of service rules with a large number of permutations and (ii) minimize the amount of churn in the flow entries caused by changes to the service rules.

Figure 2:
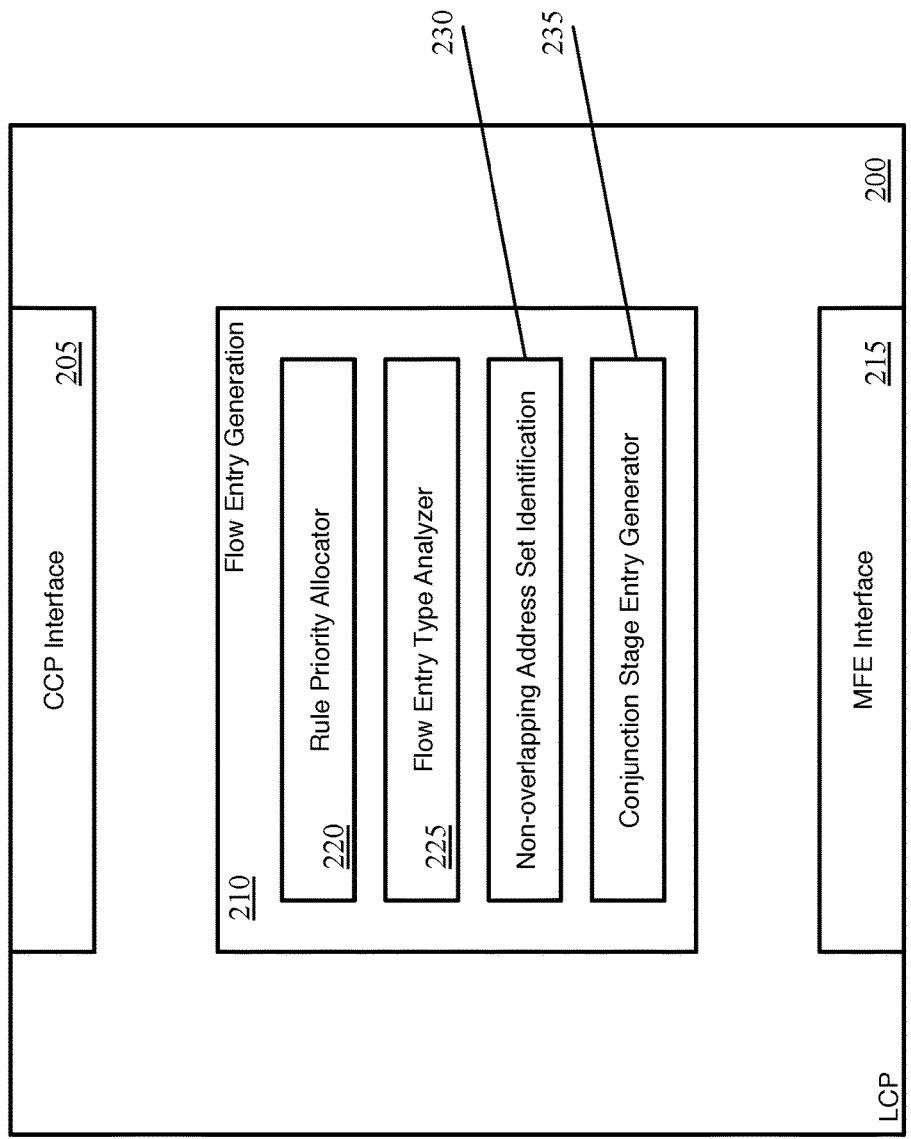
FIG. 2 conceptually illustrates the architecture of a local controller of some embodiments that manages a flow-based MFE.

FIG. 2 conceptually illustrates the architecture of a local controller 200 of some embodiments that manages a flow-based MFE. It should be understood that this diagram does not include all features of such a local controller, but instead relates specifically to those modules that perform functions related to generating flow entries for service rules to be implemented by the MFE. As shown, the local controller 200 includes a central control plane interface 205, a flow entry generator 210, and a managed forwarding element interface 215. The central control plane interface 205 receives logical network configuration data, including service rule data, from one or more central controllers (different central controllers may handle the data for different logical networks, and in the case of controller failure new controllers will take over responsibility from the failed controller).

The MFE interface 215 handles interactions with the MFE on the local host (e.g., in the virtualization software). That is, the data generated by the local controller is pushed to the MFE via this interface 215, which may be different for different types of MFEs. In addition, the MFE interface 215 receives data from the MFE (e.g., physical port numbers, etc.) which the local controller may use to calculate additional configuration data for the MFE (e.g., flow entries) in addition to passing the data up to the central control plane via the CCP interface 205.

The flow entry generator 210 generates configuration data (flow entries, in this case) for the MFE. While the flow entry generator 210 of some embodiments may include various functions, this figure illustrates certain modules related to the efficient generation of flow entries for service rules, such as distributed firewall rules. Specifically, the flow entry generator 210 includes a rule priority allocator 220, a flow entry type analyzer 225, a non-overlapping address set identification module 230, and a conjunction stage flow entry generator 235.

To accommodate the structure of the flow-based MFEs of some embodiments, the priority allocator 220 flattens the received rule sections into a single list from a highest-priority service rule to a lowest-priority service rule. The priority allocator 220 of some embodiments starts with the highest-priority rule section, and assigns those service rules the highest priorities (in the same order in which the service rules are ordered within the section), then proceeds to the next-highest-priority rule section and assigns those service rules the next highest priorities (again in the same order in which the service rules are ordered within the section), and so on through the lowest-priority rule section, with the lowest priority assigned to the lowest-priority service rule in the lowest-priority rule section.

However, simply flattening the priorities into a single list from 1-N would create substantial churn when new service rules are added. For instance, if the rules were organized from priority 1 (highest-priority rule) to priority 1000 and a new service rule was added between the priority 10 and priority 11 service rules, then the priorities of the service rules from 11-1000 would need to be modified. This would use significant network controller resources, in addition to causing substantial transaction resources and time to change all of the flow entries at the MFE.

Instead, the priority allocator 220 of some embodiments assigns the priority values in a manner designed to minimize re-assignment of priorities when changes are received to the service rules. This is complicated by the MFEs of some embodiments having a constrained space for priority assignment. For example, some MFEs have a 16-bit allocation for flow entry priority values, and thus the service rules for a particular logical network can have a maximum of 65,536 different priorities. Some embodiments divide the priority space into three contiguous subsets, with the highest and lowest priority values (e.g., the 1000 highest and 1000 lowest) left unassigned initially. Within the middle subset, the network controller spaces the service rules when assigning priority values. For example, if the middle subset has 10000 possible priority values and there are 500 service rules, some embodiments assign every $20^{th}$ priority value to a service rule. Other embodiments use two different spacing values, with a smaller spacing left between service rules within the same rule section and a larger spacing left between the lowest-priority service rule of a first rule section and the highest-priority service rule of the next rule section. This latter option allows for flexibility if rules are added/changed/removed within a rule section, while also providing for additional flexibility if rules are added at the beginning or end of a rule section or if a completely new rule section is added in between two previously-existing rule sections.

When the local controller 200 receives new service rules (e.g., based on changes made by a network administrator), the priority allocator 220 identifies the location in the list for the new rules, and assigns priority values while minimizing the number of other rules affected by the change. Thus, in the example above, if a single new rule is added between a first service rule assigned to priority X and a second service rule assigned to priority X+20, then the new rule will be assigned to priority X+10. In a more complicated case, if fifteen new rules are added in between a rule with priority X and a rule with priority X+10, then clearly the priority values for some of the rules will need to be changed. For example, if the rule with a next highest priority than priority X (i.e., lower priority value) is X−10, but the rules with the next lowest priorities after priority X+10 have priorities of X+11, X+12, and X+13, then it will affect fewer rules to move the priority X rule to priority X−6 and fit the new rules between priority X−6 and priority X+10. Some embodiments account for additional factors, such as the number of flow entries used to implement each rule, with a preference for modifying the priorities of rules that have fewer corresponding flow entries.

Once the rule priority allocator 220 assigns priority values to the service rules, the other modules of the configuration data generator then generate configuration data for the MFE (e.g., flow entries, for a flow-based MFE). In the MFE of some embodiments, flow entries within a table (or sub-table) have priorities, such that if a packet matches more than one flow entry in a stage, the MFE will execute the actions of the highest-priority matching flow entry on the packet. Some embodiments use a single stage of flow entries for the service rules (i.e., with one flow entry per service rule), while other embodiments use multiple stages of flow entries.

Specifically, in some embodiments, the service rules include matches over multiple parameters (e.g., source network address (e.g., MAC or IP address), destination network address, source transport layer port, and destination transport layer port). While a service rule can match over a single value for each parameter or multiple values for one or more of the parameters, the MFEs of some embodiments can only use flow entries with a single value (or a bitmasked value) for each parameter. Thus, multiple flow entries are required for service rules with multiple possible values for each parameter. As a simple example, a service rule with two possible values for a first parameter and one value for each of the other parameters will require two flow entries.

However, for service rules with large numbers of possible parameter values, this can lead to a massive number of flow entries. If a service rule has five possible source addresses, seven possible destination addresses, fifty possible source ports, and twenty-five possible destination ports, then simply taking the product of these parameters leads to 5*7*50*25=43,750 flow entries for a single service rule (although if the ports are in a contiguous range, then the number can potentially be lessened via bitmasking). To solve this problem, some embodiments use a conjunctive matching technique that matches over each parameter in a separate stage, and stores a conjunction value in a register when each parameter is matched. A last stage matches over this conjunction value if all of the parameters for the service rule were previously matched. In the example above, this would only require 5+7+50+25+1=88 flow entries, a significant savings. Thus, in some embodiments, the flow entry type analyzer 225 identifies, for each service rule, whether to implement the service rule using a single stage of flow entries or whether to use a conjunctive match technique that requires multiple stages of flow entries. In some embodiments, if at least two of the parameters of the service rule include two or more possible values, then the local controller will use the conjunctive matching technique.

A simple use of the conjunctive match technique is not without its problems, however. When there are many rules with overlapping parameter values, matching on the same set of addresses for many rules can create a large number of flow entries (even for single-dimensional rules that do not require conjunction). For example, if three rules match on the same set of one hundred source addresses, then this could result in 300 flow entries. However, if an initial stage was used to match each address to a separate identifier, then these three rules could each have a single flow entry matching on the separate identifier, for a total of 103 flow entries.

Thus, in some embodiments, the non-overlapping address set identifier 230 uses address set normalization to further simplify the set of flow entries to push to the MFE. Address set normalization, for each of the source and destination address parameters, identifies sets of addresses that are treated the same within all of the service rules, and groups these sets into non-overlapping groups that are each treated the same within the flow entries. For instance, if two source addresses are matched by the same five service rules, then these addresses can be assigned an identifier. Before the packet processing stage for matching source addresses, a packet will be processed through a stage that matches its source address to a group identifier, which the MFE matches over at the source address processing stage rather than matching over the actual addresses.

The network controller receives a group of service rules for implementation by the MFE, with each service rule matching over a set of addresses (actually, this is generally two separate sets, one for source addresses and one for destination addresses). For each of the source and destination addresses, these groups may be partially overlapping. For instance, rule A might match over the set of addresses {K, L, M}, while rule B matches over the set of addresses {K, L, N}. In this case, the network controller would flatten these addresses, then identify three groups of addresses: {K, L} (for both service rules), {M} (for service rule A), and {N} (for service rule B). Thus, the first stage of packet processing relevant to these rules would assign a first group identifier to packets with address K or L, a second group identifier to packets with address M, and a third group identifier to packets with address N. While this example has a small number of addresses and therefore does not provide any significant savings in terms of the number of flow entries or potential number of required resubmits, for large groups with significant but imperfect intersections between rules, this address set normalization will provide substantial savings.

In addition, with regards to conjunctive flow entries of some embodiments, a first pass through the first stage might match the source address (taking that as the first parameter) of the packet with the highest priority rule for that source address, but that source address might also be a match for numerous other lower-priority rules. If the packet does not match a full set of parameters for that highest-priority rule, then some embodiments will return to the first stage with the highest-priority match for that source address eliminated and try again. However, this can lead to extensive use of resubmissions of a packet, which uses substantial computing resources and time. Furthermore, the MFE of some embodiments may have an upper limit on the number of resubmissions allowed for a single packet, which may be pushed by having to repeatedly resubmit a packet for multiple parameters (as similar issues may occur with the destination address, source port, and destination port). The use of address set normalization can solve this problem in some embodiments as well.

The conjunction stage flow entry generator 235 generates the staged flow entries once address set normalization has been performed (for embodiments that use address set normalization). The conjunction stage flow entry generator 235 generates flow entries for assigning identifiers to packets based on the source and/or destination addresses, as well as the conjunction stages that match each parameter and a final stage for determining whether all of the conditions are met for any particular rule. In some embodiments, the non-conjunctive (single stage) flow entries are generated using the normalized address sets as well.

The above introduces the generation of flow entries for implementing service rules. In the following, Section I describes the allocation of priority values to a set of service rules for a logical network, while Section II describes the generation of flow entries for these service rules. Section III then describes the electronic system with which some embodiments of the invention are implemented.

I. Service Rule Priority Allocation

As mentioned, in some embodiments the local controller (or a centralized controller that generates flow entries for service rules) includes a priority allocation function that takes one or more sets of service rules for a logical network and assigns priorities to the service rules so that these priorities can be used for the flow entries that enable a managed forwarding element to implement the service rules.

The controller receives these service rules organized as one or more rule sections with priorities, from a highest-priority section to a lowest-priority section. In addition, within each section, the service rules themselves are organized from a highest-priority service rule to a lowest-priority service rule.

To accommodate the structure of the MFEs of some embodiments, the controller flattens these rules into a single list from a highest-priority service rule to a lowest-priority service rule. The controller of some embodiments starts with the highest-priority section, and assigns those service rules the highest priorities (in the same order in which the service rules are ordered within the section), then proceeds to the next-highest-priority section and assigns those service rules the next highest priorities (again in the same order in which the service rules are ordered within the section), and so on through the lowest-priority section, with the lowest priority assigned to the lowest-priority service rule in the lowest-priority section.

However, simply flattening the priorities into a single list from 1-N would create substantial churn when new service rules are added. For instance, if the rules were organized from priority 1 (highest-priority rule) to priority 128 and a new service rule was added between the priority 51 and priority 52 service rules, then the priorities of the service rules from 52-128 would need to be modified. This would use significant network controller resources, in addition to causing substantial transaction resources and time to change all of the flow entries at the MFE.

Instead, some embodiments assign the priority values in a manner designed to minimize re-assignment of priorities when changes are received to the rule sections. This is complicated by the MFEs of some embodiments having a constrained space for priority assignment. For example, some MFEs have a 16-bit allocation for flow entry priority values, and thus the service rules for a particular logical network can have a maximum of 65,536 different priorities. Some embodiments divide the priority space into three contiguous subsets, with the highest and lowest priority values (e.g., the 2000 highest and 2000 lowest) left unassigned initially. Within the middle subset, the network controller spaces the service rules consistently when assigning priority values. Other embodiments use two different spacing values, with a smaller spacing left between service rules within the same rule section and a larger spacing left between the lowest-priority service rule of a first rule section and the highest-priority service rule of the next rule section. This latter option allows for flexibility if rules are added, changed, or removed within a rule section, while also providing for additional flexibility if rules are added at the beginning or end of a rule section, or if a completely new rule section is added in between two previously-existing sections.

Figure 3:
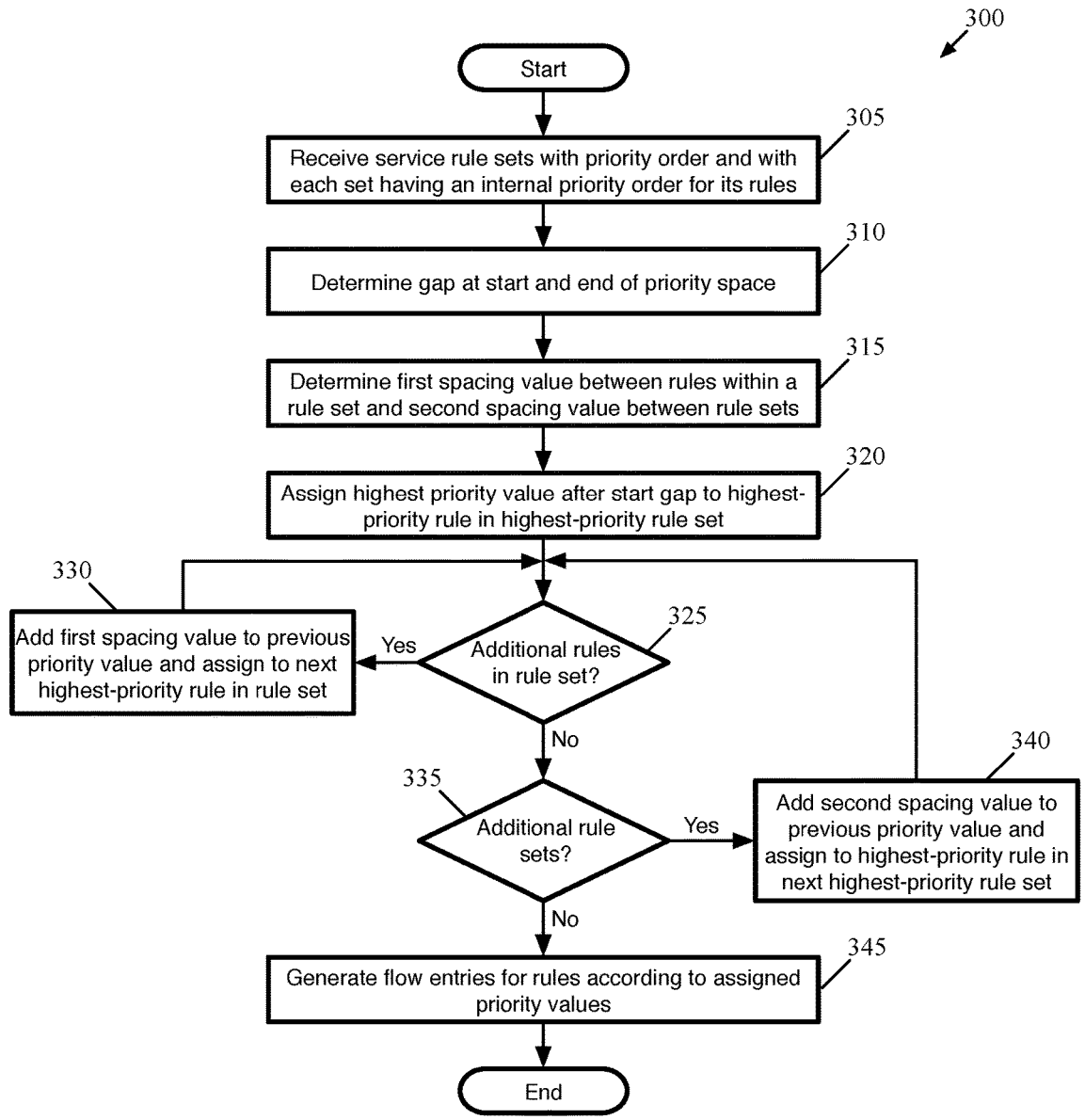
FIG. 3 conceptually illustrates a process of some embodiments for assigning priority values to an initial set of distributed service rule sets.

FIG. 3 conceptually illustrates a process 300 of some embodiments for assigning priority values to an initial set of distributed service (e.g., firewall, etc.) rule sets. While described herein with respect to distributed firewall rules, it should be understood that rules for other distributed services may have the same sorts of issues (i.e., many rules that will be evaluated together at the same stage (or stages) of a packet processing pipeline in a flow-based MFE). For instance, distributed NAT rules, load balancer rules, etc., might operate in the same manner, and a single rule could match over numerous possible values for multiple parameters. As noted, in some embodiments the process 300 is performed by a local controller operating on a host machine with the MFE for which it generates the flow entries.

The process 300 will be described in part by reference to FIG. 4. This figure illustrates a rule priority allocator 400 (e.g., a module in a local controller) that receives a set of rule sections 405 and generates an overall rule set 410 with a flat list of priority values according to some embodiments of the invention.

As shown, the process 300 begins by receiving (at 305) service rule sets (i.e., rule sections) with a priority order and with each set having an internal priority order for its rules. In some embodiments, the local controller receives these rule sections from a central control plane, as configured according to user input (e.g., from a network administrator). The network administrator may group the rules into sections and determine the relative order of priority within that section.

Figure 4:
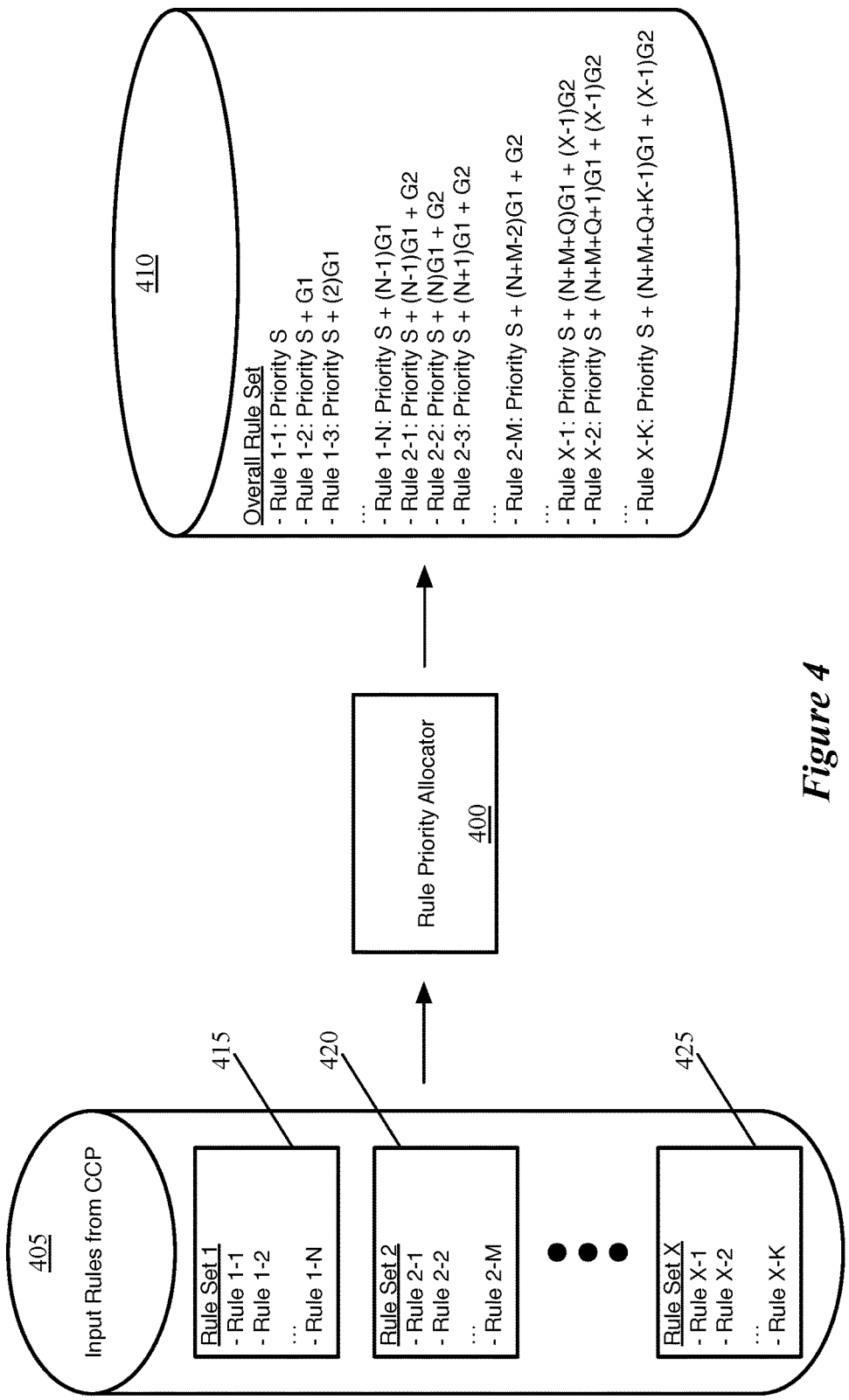
FIG. 4 illustrates a rule priority allocator that receives a set of rule sections and generates an overall rule set with a flat list of priority values according to some embodiments of the invention.

FIG. 4 illustrates an example of such a set of rule sections 405 received from the central control plane. Specifically, this figure illustrates X rule sets, each with multiple ordered rules. These X rule sets are arranged in priority order from 1 to X, with 1 being the highest-priority rule set and X being the lowest-priority rule set. In addition, each rule set has at least three service rules arranged in their own relative order. The first rule set 415 has N rules arranged with priorities from 1 to N (rule 1-1 being the highest-priority rule, and rule 1-N being the lowest priority rule in the section). The second rule set 420 has M rules arranged with priorities from 1 to M, and the last (Xth) rule set 425 has K rules arranged with priorities from 1 to K.

Returning to FIG. 3, the process 300 determines (at 310) gaps at the start and end of the priority space. The process 300 also determines (at 315) a first spacing value between rules within a rule set and a second spacing value between rule sets. As described above, in some embodiments, the priority allocator leaves a certain number of priority values free at the start and end of priority space when initially assigning priorities to the service rules. In addition, the priority allocator leaves gaps (if possible) between the priority values assigned to the rules. The first and second spacing values may be the same (i.e., the same gap between the last rule in a first section and the first rule in the next section as the gap between two subsequent rules in the same section) or different, in different embodiments. In some embodiments, however, the priority allocator only uses a single spacing value for the entire flat list of rules, and thus only needs to determine a first (inter-rule) spacing value.

Different embodiments may determine these three or four gaps (start, end, inter-rule spacing, and optionally inter-section spacing) in different manners. For instance, some embodiments use hard-coded (pre-specified) values for some or all of these gaps. As an example, some embodiments could have a pre-specified (or maximum) start and end gap sizes (e.g., 1024, for a 16-bit priority space), and then calculate the inter-rule and inter-section gap spacing based on the number of rules in each rule section. Different embodiments might use different calculations to balance the inter-rule and inter-section gap spacings (e.g., having the inter-section gap spacing two or three times the size of the inter-rule spacing, having an initial value for the inter-section gap spacing and reducing this value if the inter-rule gaps are too small or if all of the rules do not fit, etc.). Some embodiments let all four (or three, if the start and end gaps are assumed to be the same size) gap values be variable, but use optimal relations between the values (e.g., that the inter-section gap should be at least four times the inter-rule gap, that the start and end gaps should be a minimum of 100 and optimally ten times the inter-section gap, etc.) and perform a constrained optimization algorithm to determine the gaps for a particular initial set of rule sections.

For a priority space from 0 to 100, an example might have initial start and end gaps of 20. Upon receiving a logical network configuration with a first rule section having 10 rules and a second rule section having 15 rules, the priority allocator would have to fit these 25 rules into the priority space from 20 to 80. Thus, an inter-rule gap of 1 would have the rules of the first rule section assigned priorities from 20 to 38, and the rules of the section rule section assigned priorities from 52 to 80, thus resulting in an inter-section gap of 14. If an inter-rule gap of three was desired, the start, end, and inter-section gaps could be adjusted.

With the gaps determined, the process 300 can then assign priorities to each of the rules in the rule sections. The process starts by assigning (at 320) the highest priority value after the start gap to the highest-priority rule in the highest-priority rule set. Next, the process determines (at 325) whether there are additional rules remaining in the current rule set (initially, the highest-priority rule set). So long as there are additional rules remaining, the process adds (at 330) the determined first spacing value to the previous priority value (the value last assigned to a rule) and assigns this new value to the next highest-priority rule in the current rule set. Thus, if the start gap is 500 and the first (inter-rule) spacing gap is 9, the process would assign a priority value of 20 to the highest-priority rule in the first rule set and 30 to the second highest-priority rule in the first rule set. The process 300 continues assigning priority values to rules in the current rule set at 330 until all rules in the set have been assigned priority values.

Once a priority value is assigned to the last rule in a rule section, the process determines (at 335) whether any additional rule sets (sections) remain that have not yet had priority values assigned. When the most recent rule set is not the lowest-priority rule set (i.e., there are additional sections to which to assign priority values), the process adds (at 340) a second (inter-section) spacing value to the previous priority value (that of the lowest-priority rule in the previous section) and assigns this new value to the highest-priority rule in the next highest-priority rule set. For instance, if the last rule in the first rule section was assigned priority 650 and the inter-section spacing is 24, then the highest-priority rule in the second rule section will be assigned priority 675. The process then returns to 325 and 330 to assign priorities to the rest of the rules in this section based on the inter-rule gap. It should be understood that, in the case in which only a single inter-rule gap is used (and no separate inter-section gap), the process iterates through the rules adding the inter-rule spacing value after each rule is assigned its priority value.

Once the last rule in the last rule section has been assigned (i.e., there are no additional rules in the rule set at 325 and no addition rule sets at 335), the process 300 generates (at 345) flow entries for the rules according to the assigned priority values. The generation of these flow entries will be described in greater detail below in Section II. In some embodiments, the network controller generates multiple stages of flow entries for some or all of the rules. In some such embodiments, all flow entries for a rule are assigned the same priority based on the process 300. In other embodiments, however, the assigned priorities are only used for flow entries at some of the stages, with the flow entries for other stages having a uniform priority across the various rules (possibly involving intermingling of the rules).

FIG. 4 illustrates the result of using such an initial priority assignment process for the rule sections 405. As noted above, these rules include X rule sections 415-425, with varying numbers of rules in each section. The right side of the figure illustrates the flattened list of rules 410 with priority values assigned by the priority allocator 400. In this case, the priority allocator determines a start gap value of S, an inter-rule gap value of G1, and an inter-section gap value of G2. The G1 and G2 values are taken to be inclusive of the next rule, such that an inter-rule gap value of G1=10 means rules will have priorities of 10, 20, 30, etc. (as opposed to 10, 21, 32, etc.).

Thus, the first rule (Rule 1-1) of the first section 415 has a priority value of S (the start gap value). The second rule (Rule 1-2) has a value of S+G1 (i.e., value of the previous rule plus the inter-rule gap value). The priority values for the subsequent rules (Rule 1-3, etc.) in the set are calculated by adding G1 to the priority value for the previous rule, such that Rule 1-3 has a priority of $S+(2*G1)$, Rule 1-4 has a priority of $S+(3*G1)$, and eventually rule 1-N has a priority of $S+((N-1)*G1)$. After the last rule in the first rule set 415 (Rule 1-N), the priority allocator 400 adds the inter-section gap value G2 for the priority value of the first rule in the second rule set 420 (Rule 2-1), such that this rule has a priority value of $S+((N-1)*G1)+G2$. For each subsequent rule in the second rule set 420, the priority allocator 400 adds the inter-rule gap value G1, so that Rule 2-2 has a priority of $S+(N*G1)+G2$, Rule 2-3 has a priority of $S+((N+1)*G1)+G2$, up to Rule 2-M with a priority of $S+((N+M-2)*G1+G2$. The priority allocator continues on in this manner for any intervening rule sets before the last (Xth) rule set 425. For the start of the Xth rule set, there will have been X-1 inter-section gaps, and N+M+Q inter-rule gaps, where Q+1 is the number of rules from the third rule set to the (X-1)th rule set combined, minus the number of rule sets (X-3, the number of inter-section gaps used instead of inter-rule gaps). Thus, the first rule in this rule set (Rule X-1) is assigned a priority value of $S+((N+M+Q)*G1)+((X-1)*G2)$. The inter-rule gap value of G1 is added for each subsequent rule in this rule set 425, up until the Kth rule (Rule X-K) which has the lowest priority value of all of the rules 405, $S+((N+M+Q+K)*G1)+((X-1)*G2)$. Optimally, this value should be S priorities from the highest number (lowest possible priority value) in the available priority space.

Figure 5:
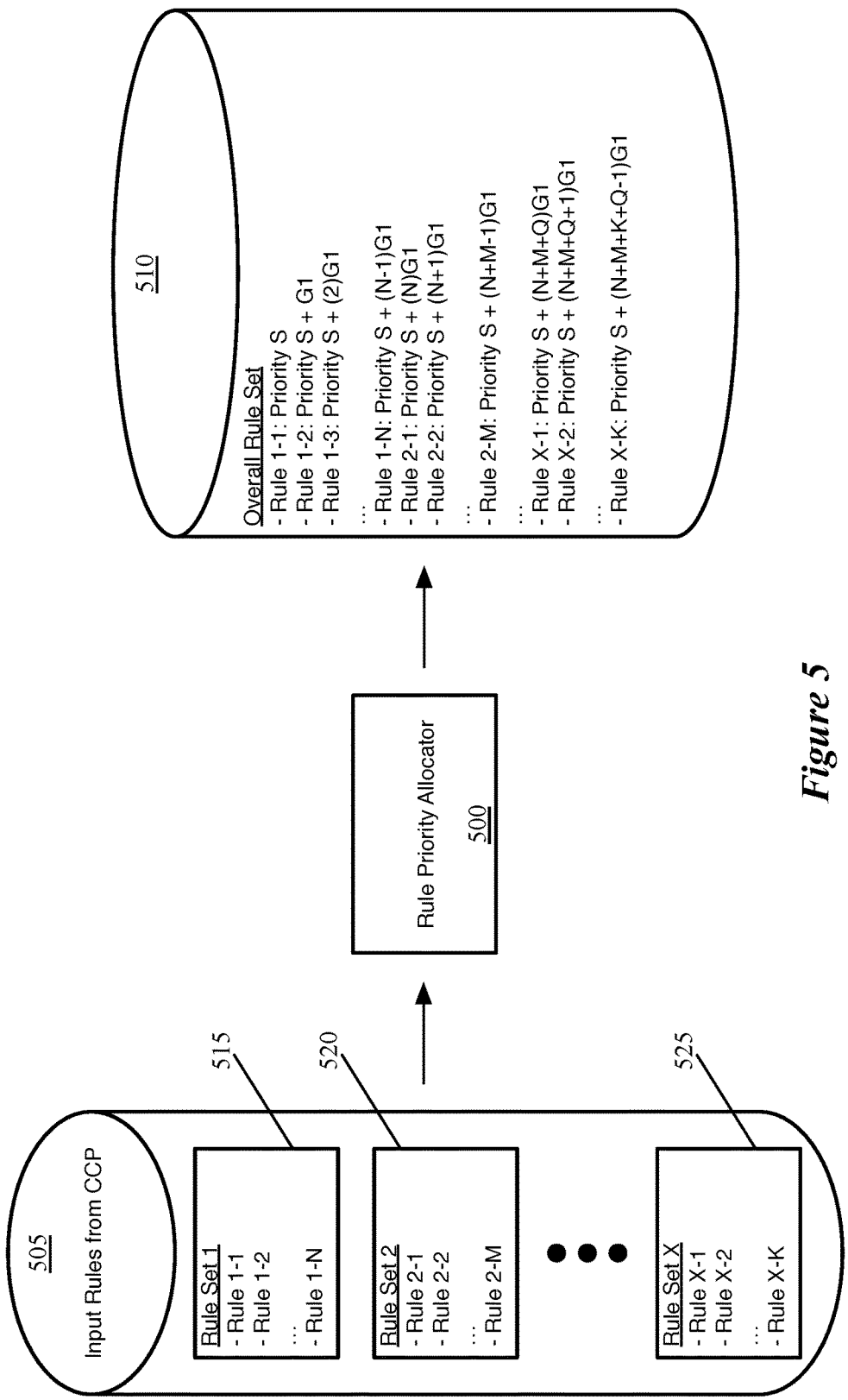
FIG. 5 illustrates a rule priority allocator receives a set of rule sections 505 and generates an overall rule set with a flat list of priority values according to some other embodiments.

As mentioned, FIG. 5 illustrates a rule priority allocator 500 (e.g., a module in a local controller) that receives a set of rule sections 505 and generates an overall rule set 510 with a flat list of priority values according to some embodiments. Whereas the rule priority allocator 400 of FIG. 4 uses separate inter-section and inter-rule spacing values, the rule priority allocator 1000 uses only a single inter-rule spacing value to allocate the priority values to the rules. Like in FIG. 4, the set of rule sections 505 received from the central control plane includes X rule sets, arranged in a priority order from 1 to X (1 being the highest-priority rule set and X being the lowest-priority rule set). Each rule set has at least three service rules arranged in their own relative order, as in the FIG. 4.

As in the previous figure, the right side of FIG. 5 illustrates the flattened list of rules 510 with priority values assigned by the priority allocator 500. In this case, the priority allocator determines a start gap value of S and an inter-rule gap value of G1. The G1 value is again taken to be inclusive of the next rule, such that an inter-gap value of G1=8 means rules will have priorities of 8, 16, 24, etc. Thus, the first rule (Rule 1-1) of the first section 515 again has a priority value of S (the start gap value). The rest of the rules in the first section 515 follow the same pattern as in the previous example, with the values calculated by adding G1 to the priority value for the previous rule. From Rule 1-N to Rule 2-1, the rule priority allocator simply adds the same spacing value G1 again, such that the Rule 2-1 has a priority value of S+(N*G1), Rule 2-2 has a priority value of S+((N+1)*G1), etc. Eventually, Rule X-1 has a priority value of S+((N+M+Q)*G1), where in this case Q is equal to the combined number of rules in all of the sections from the third rule set to the (X−1)th rule set. The same value G1 is added to each subsequent rule in the Xth rule set as well, with the last Rule X-K having a priority value of S+((N+M+K+Q−1)*G1).

The above describes the initial generation of priority values for service (e.g., distributed firewall) rules by a network controller, which (so long as there are not too many rules) results in an even distribution of priority values within the available priority space. However, the administrator for a logical network may change the service rules, which (unless the changes only result in 1-for-1 replacements) will affect these priority values. Re-assigning the priority values for all of the rules would result in a new even distribution, but would also use a large amount of computing resources for the network controller, both reassigning the priorities and generating new flow entries. Furthermore, the resources and downtime involved in replacing thousands of flow entries at the MFE are significant. Instead, the initial assignment of priorities is designed to attempt to minimize the amount of churn required when the administrator modifies the service rule configuration. When a rule is removed, the controller simply removes this rule from the flattened list of rules, and subsequently opens up the priority value previously used for that rule in the case of added new rules.

When the controller receives new service rules (e.g., based on changes made by a network administrator), the priority allocator identifies the location in the list for the new rules, and assigns priority values while minimizing the number of other rules affected by the change. Thus, if a single new rule is added between a first service rule assigned to priority 550 and a second service rule assigned to priority 560, then the new rule will be assigned to priority 555. In a more complicated case, if fifteen new rules are added in between a rule with priority 500 and a rule with priority 510, then clearly the priority values for some of the existing rules will need to be changed. For example, if the rule with a next highest priority than priority 500 (i.e., lower priority value) is 490, but the rules with the next lowest priorities after priority 510 have priorities of 511, 512, and 513, then it will affect fewer rules to move the priority X rule to priority 494 and fit the new rules between priority 494 and priority 510. Some embodiments account for additional factors, such as the number of flow entries used to implement each rule, with a preference for modifying the priorities of rules that have fewer corresponding flow entries.

Figure 6:
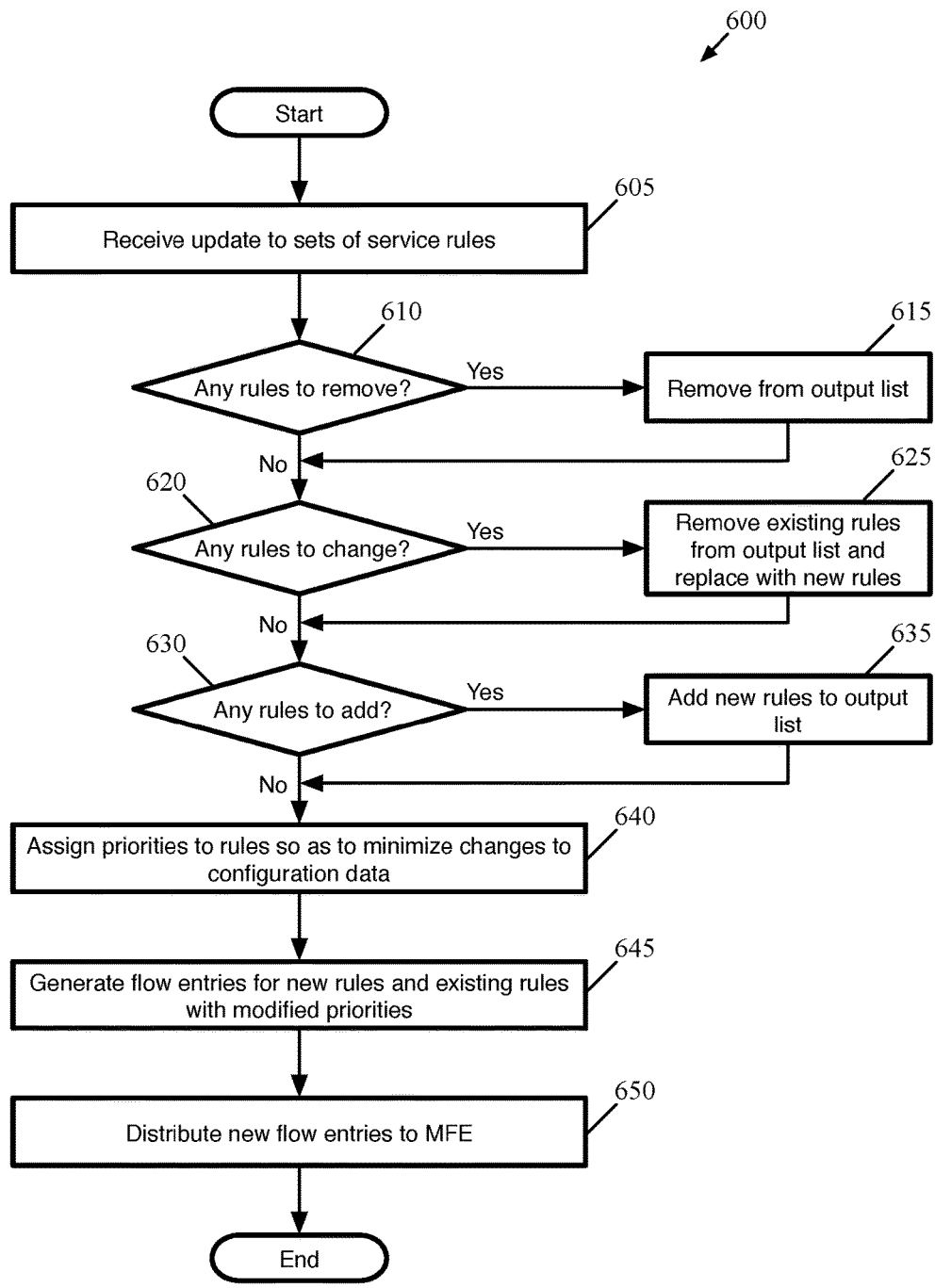
FIG. 6 conceptually illustrates a process of some embodiments for processing updates to a set of distributed service (e.g., firewall, NAT, load balancer, etc.) rule sets.

FIG. 6 conceptually illustrates a process 600 of some embodiments for processing updates to a set of distributed service (e.g., firewall, NAT, load balancer, etc.) rule sets. As with the process 300, this process 600 is performed by a network controller that manages one or more flow-based MFEs, such as a local controller operating on the same host machine as a flow-based MFE. The process 600 will be described in part by reference to FIGS. 7-9, which illustrate examples of modifications to sets of rule sections and the corresponding changes to priority values of the rules.

As shown, the process 600 begins by receiving (at 605) an update to a set of distributed service (e.g., firewall, NAT, etc.) rule sets (i.e., rule sections). In some embodiments, a local controller that manages a particular flow-based MFE receives this update from a central control plane (e.g., a centralized network controller), based on user input to modify the service rules for a logical network (e.g., from a network administrator). These updates might include the addition or removal of entire rule sections, the addition or removal of rules within an existing rule section, the modification of one or more existing rules, the changing of the order of rules within a rule set, etc. For instance, a user might have arranged rule sections based on the logical forwarding element to which the service rules apply; thus, when adding a new logical switch, a new rule section would correspondingly be added as well.

Upon receipt of the update, the process 600 determines (at 610) whether any existing rules should be removed based on the updates. As mentioned, this could be the removal of a single rule from one rule section or the removal of one or more entire rule sections. When there are rules to remove, the process removes (at 615) these rules from the output list (i.e., the flattened list of rules in priority order). Some embodiments remove rules before adding any new rules so that the priority values of the removed rules are freed up prior to determining how to best assign priority values to the new rules.

The process 600 also determines (at 620) whether any existing rules are to be modified based on the updates. This could be the modification of one or more parameter values for a rule (e.g., modifying the source address set, destination address set, source port set, or destination port set over which a rule matches). For example, an initial rule might match over the set of source addresses {A, B, C, D}, but be changed to match over the set of source addresses {A, B, C, E}, {A, C, D}, {A, B, C, D, E}, or some other combination. The modification to a rule might also (or alternatively) change the action to perform for packets that match the parameters specified by the rule. For instance, a firewall rule might change from dropping packets matching certain characteristics to allowing those packets.

When the update specifies rules to modify, the process removes (at 625) the corresponding existing rules from the output list and replaces the existing rule with a new rule. The new rule may or may not be assigned the same priority value, depending on the other changes to the service rules. For instance, if numerous rules with a higher priority value than the modified rule are removed, then the new rule end up with a higher priority value so that it falls in the middle of its two surrounding rules. As the flow entries for the rule will be re-calculated anyway, modifying the priority values will not affect the number of rules that need to be re-calculated.

The process 600 also determines (at 630) whether any new rules are added based on the updates. As with the removal, this could be the addition of a single rule or multiple rules from existing rule sections, or the addition of a completely new rule section. New rule sections might be added with a priority between two existing rule sections, or at either end (highest-priority or lowest-priority) of the list of rule sections. When there are rules to add, the process adds (at 635) these rules to the output list (i.e., the flattened list of rule in priority order).

Once the new rules are incorporated into a flat list, the process 600 assigns (at 640) priorities to the new rules (both completely new rules and modified rules replacing existing rules) in a manner so as to minimize the changes to the configuration data (e.g., the flow entries). Different embodiments may perform this priority assignment in different ways. In general, if there is room in the gaps in priority space to assign values to the new rules without changing the priority of any existing rules, this option will be used.

Figure 7:
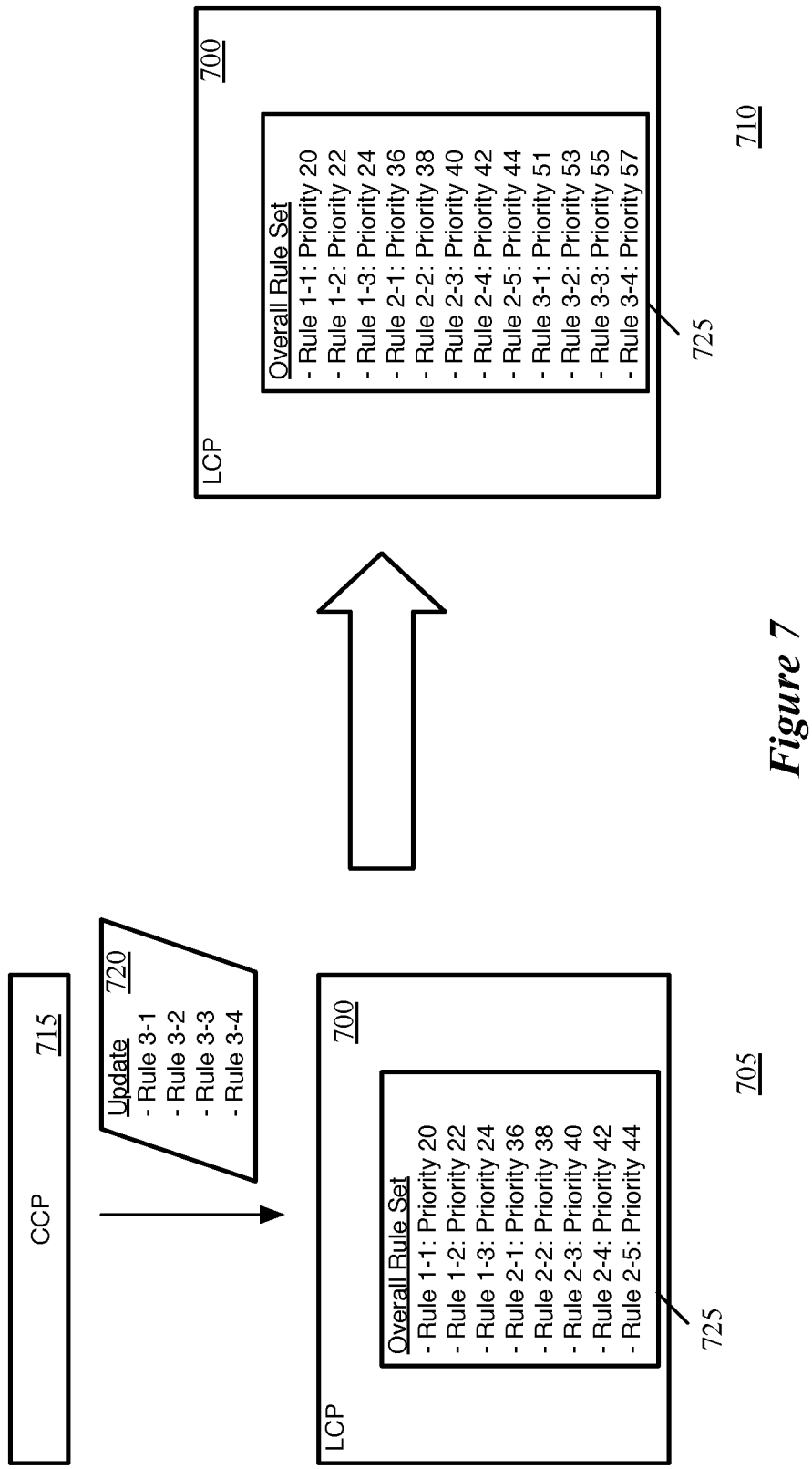
FIGS. 7-9 illustrate examples of modifications to sets of rule sections and the corresponding changes to priority values of the rules.

For instance, the rules of a new rule section added at the beginning or end of the list of rule sections will be assigned priority values in the start or end gaps. FIG. 7 conceptually illustrates an example of this type of update. Specifically, FIG. 7 illustrates a central control plane 715 providing an update 720 to a local controller 700 that already stores a flattened set of rules 725 with priority values, over two stages 705 and 710. In this case, the priority space is a small 6-bit space, with values from 0 to 63. While such a small priority space is not realistic for a system with large numbers of rules, it is used as an illustrative example.

In the first stage 705, the local controller 700 stores a flat list of service rules for a logical network, which are divided into two rule sections. The local controller 700 would have already generated flow entries for these service rules and distributed the flow entries to the MFE that it manages. In this example, the start and end spacing gap is 20, the inter-rule gap is 1, and the inter-section gap is 11. Thus, the first set of rules has priorities of 20, 22, and 24, while the second set of rules has priorities of 36, 38, 40, 42, and 44. At this point, the rules have not received many updates, and thus the gaps between rules are uniform. Additionally, at this stage 705, the local controller receives an update 720 that adds a third set of rules for the logical network, with a lower priority than the existing sets of rules.

Thus, the local controller 700 adds these rules into the gap between the last rule set and the end of priority space. In some embodiments, the inter-rule gap of 1 is preserved, and the controller assigns the priority values so that the same amount of priority space is available on either side of the new rule section. In this case, a gap of 6 is used between the last rule (priority 44) and the first rule of the new set. As such, the new rules are assigned priorities of 51, 53, 55, and 57, with 6 available priority values remaining at the end of priority space. When the start or end gap is larger, some embodiments do not "center" the priority values for the new rules, but instead use the inter-section gap between the lowest-priority (or highest-priority) rule section and the new section, with a larger gap at the start or end. In this case, enough space was available to maintain an inter-rule gap between all of the rules, but in some cases the rules will be assigned consecutive priority values if not enough space is otherwise available.

Figure 8:
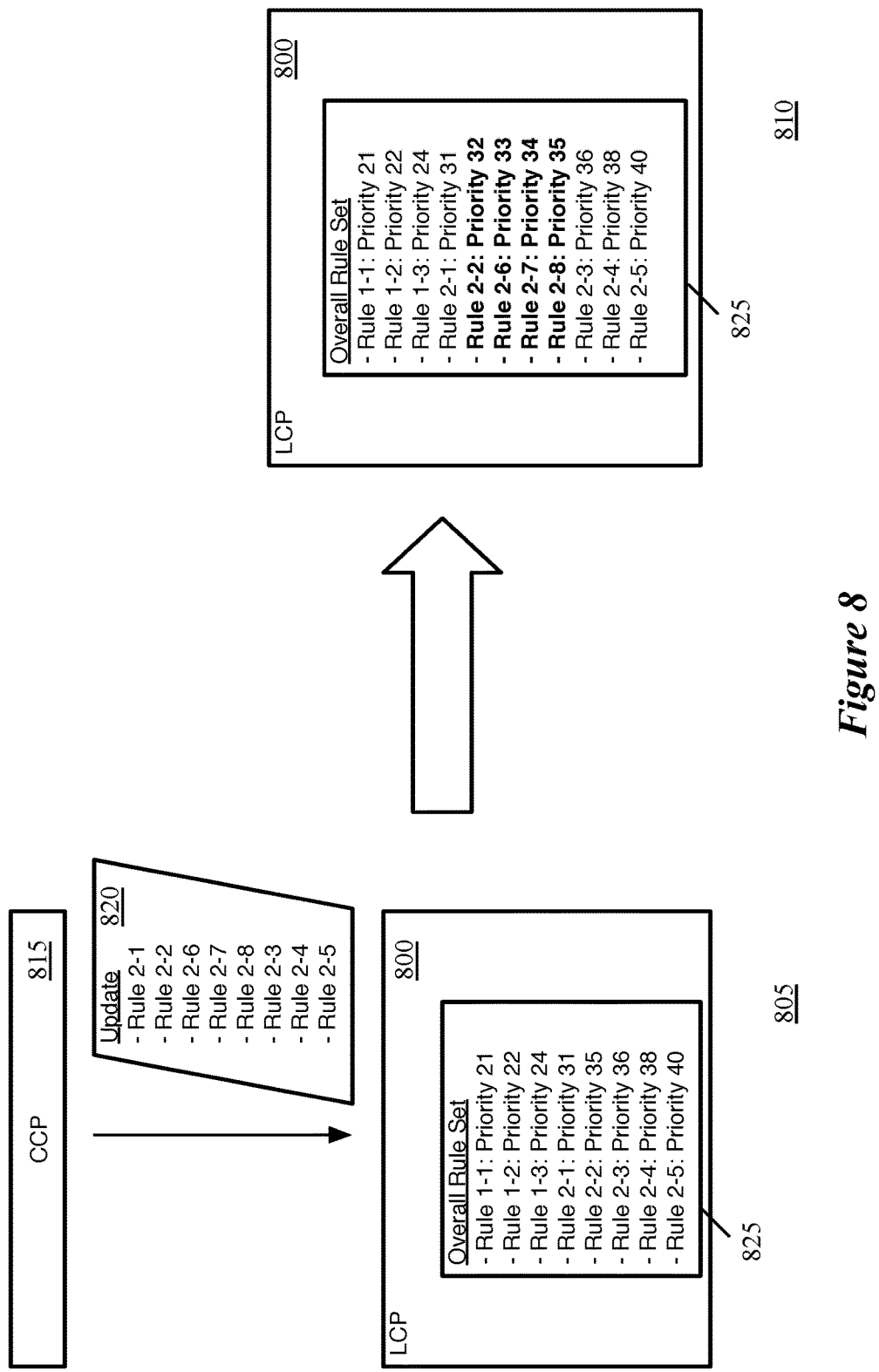

While FIG. 7 illustrates the case in which an entire rule section is easily added to the list with no need to rearrange existing priority values, in many cases not all of the added rules will fit in between the priority values of the existing rules. FIG. 8 conceptually illustrates an example of a local controller 800 receiving an update 820 from a central control plane 815 that adds rules requiring the reassigning of priority values to existing rules, over two stages 805 and 810. As with the previous example, the priority space here is a 6-bit space with values from 0 to 63.

As shown in the first stage 805, the local controller 800 stores a flat list of service rules 825 for a logical network, which are divided into two rule sections. The local controller 800 would have already generated flow entries for these service rules and distributed the flow entries to the MFE that it manages. In this example, the service rules have seen some amount of change, and are thus not evenly distributed in priority space. As shown, the first rule section has three rules with priority values 21, 22, and 24, while the second rule section has five rules with priority values 31, 35, 36, 38, and 40. In some embodiments, when updates are received, the controller reallocates priority values so as to minimize the churn for that specific update, even if doing so has the possibility of resulting in greater churn later (i.e., Rule 2-2 with priority value 35 is not reassigned to a priority of 33 or 34 until an update inserts a rule between Rule 2-2 and Rule 2-3).

At this first stage 805, the local controller 800 receives the update 820 from the central control plane 815, which adds three rules to the second rule section. Specifically, Rules 2-6, 2-7 and 2-8 are added between Rule 2-2 and Rule 2-3. Because Rule 2-2 has a priority value of 35 and Rule 2-3 has a priority value of 36, this update will mandate that new flow entries be created for at least one of the existing rules in addition to the newly added rules.

In the second stage, the local controller 800 has assigned priority values to the new rules and re-assigned priority values to the existing rules in such a manner as to minimize the number of existing rules whose priority values were re-assigned (and thus for which the flow entries will need to be modified). In this case, the options are to re-assign Rule 2-2 to a higher priority value (lower number) or to re-assign Rule 2-3 to a lower priority value (higher number). However, re-assigning Rule 2-3 would require also re-assigning Rule 2-4 or Rule 2-2, because four rules need to fit between Rule 2-2 (at priority value 35) and Rule 2-4 (at priority value 38). However, if Rule 2-2 is re-assigned to priority value 32, then the three new rules can be assigned priority values 33, 34, and 35 without the need to re-assign any of the other rules. Thus, the local controller would subsequently generate new flow entries for Rule 2-2 as well as flow entries for the three new rules (as well as any new address set normalization flow entries, as described below), and push these flow entries to the local MFE.

In the above example, each rule is treated as having equal weight in determining whether to re-assign the rule to a new priority value. However, as described below in Section II, in some embodiments the controller generates different numbers of flow entries for different rules. As such, some such embodiments take into account the number of flow entries for each rule that might have its priorities re-assigned, and re-assign priorities so as to minimize the number of flow entries that will have to be re-generated rather than the number of rules re-assigned.

Figure 9:
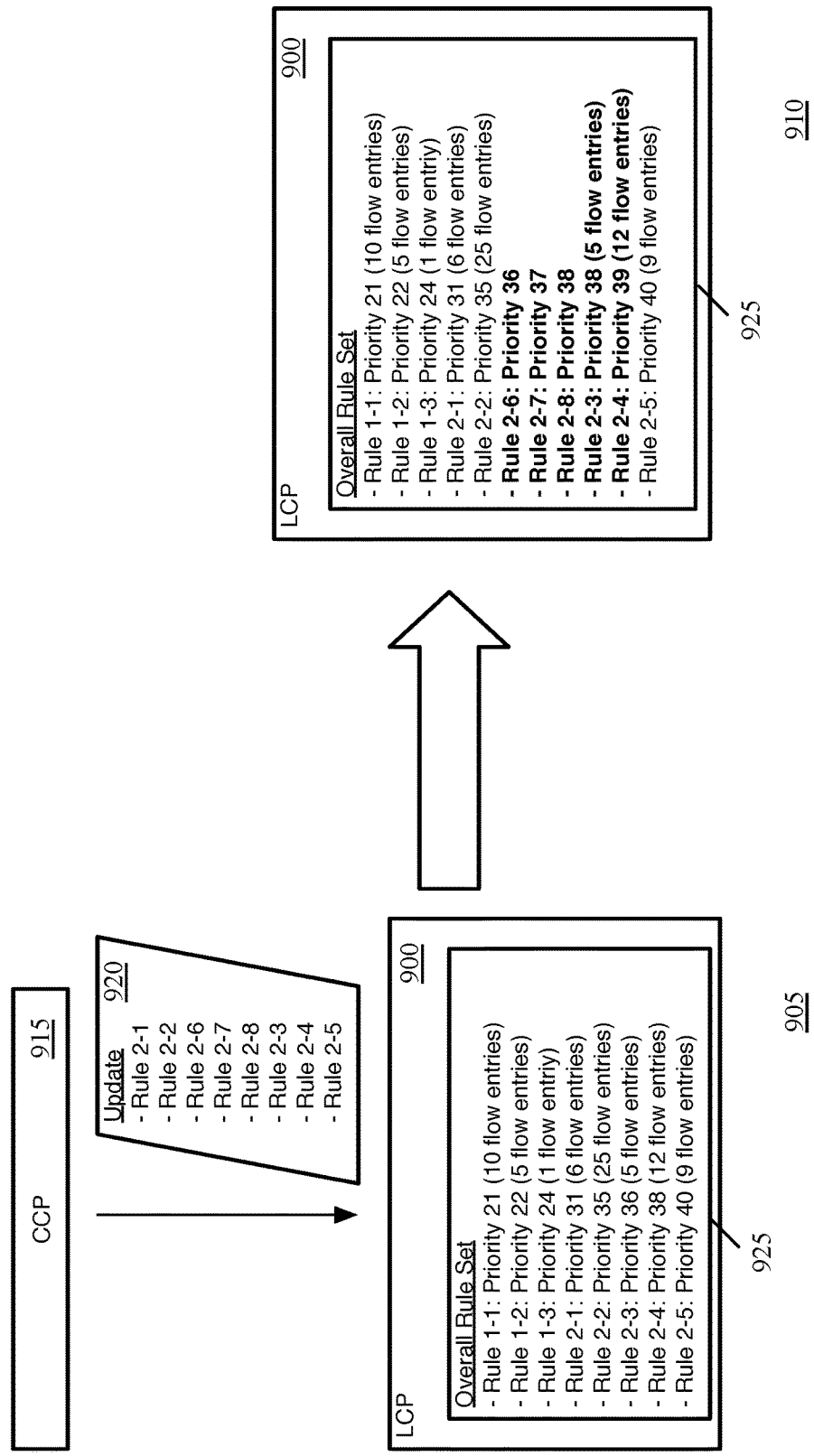

FIG. 9 conceptually illustrates an example of a local controller 900 receiving an update 920 from a central control plane 915 that adds rules requiring the re-assignment of priority values to existing rules, over two stages 905 and 910. As in the previous examples, the priority space is a 6-bit space with values from 0 to 63.

As shown in the first stage 905, the local controller stores a flat list of service rules 925 for a logical network, divided into two rule sections. In addition, the controller stores data indicating for each rule the number of flow entries used to implement the rule. Thus, for example, Rule 1-3 only requires a single flow entry (presumably because this rule only has one possible parameter for each match field) while Rule 2-2 requires twenty-five flow entries, with other rules requiring various numbers of flow entries in between these two. The priority values assigned to the service rules are in the same configuration as in the previous example of FIG. 8.

At this first stage 905, the local controller 900 receives the update 920 from the central control plane 915, which adds three rules to the second rule section (in the same manner as the update 820 in the example of FIG. 8). Specifically, Rules 2-6, 2-7, and 2-8 are added between Rule 2-2 and Rule 2-3. Because Rule 2-2 has a priority value of 35 and Rule 2-3 has a priority value of 36, this update will mandate that new flow entries be created for at least one of the existing rules in addition to the newly added rules.

Whereas in the previous example only Rule 2-2 had its priority value re-assigned, in this case it is preferable to re-assign multiple rules with fewer flow entries. Changing the priority value for Rule 2-2 would require re-generating and distributing twenty-five flow entries, whereas Rule 2-3 has five flow entries and Rule 2-4 has twelve flow entries. Thus, changing the priority values of these two rules (such that Rule 2-4 has a priority value of 39 and Rule 2-3 has a priority value of 38) only requires seventeen flow entries to be recomputed and distributed to the MFE. Thus, in this case the solution with less churn is to change the priority value of both of these rules, while leaving Rule 2-2 unchanged.

Returning to the process 600 of FIG. 6, after assigning priority values to the new rules and any rules whose priority values require modification, the process generates (at 645) flow entries for the new rules and the existing rules with modified priority values. This flow entry generation is described in further detail below in Section II. The process then distributes (at 650) the new flow entries to the MFE, which also includes removing flow entries for any removed and/or modified rules. The process 600 then ends.

While the above examples are simple updates that add only a few rules to one rule section or add a new rule section, it should be understood that in other cases the changes may be interspersed throughout one or multiple rule sections. Different embodiments handle such rule updates differently. For instance, some embodiments treat each new rule or group of consecutive new rules as a separate update, and optimize that new rule insertion without regard to the other new rules that will be processed as subsequent updates (e.g., starting with the highest or lowest priority new rules). Other embodiments perform more complex computations by treating all of the new rules as a single update and attempting to minimize the amount of churn (e.g., number of recomputed flow entries or number of rules with re-assigned priority values) for the update as a whole.

Some embodiments also use caching operations to minimize the churn when the local controller restarts. In general, when a local controller restarts (for any of a myriad of reasons), the central controller will detect this occurrence and re-synchronize configuration data with the local controller. This re-synchronization of data includes the service rules in some embodiments. However, in normal (non-caching) operation, if the local controller receives a new set of rules, it will recalculate the priority values for these rules and generate new flows. If the corresponding flows on the MFE were not the original set of rules and thus did not have the optimal priority values as calculated by, e.g., the process 300 (but instead had priorities resulting from later decisions to minimize churn), then the local controller would regenerate the flow entries for these rules and replace the entire set of flow entries on the MFE.

As this wholesale replacement would be sub-optimal, some embodiments first read the flow entries from the MFE and cache the priority values of these flow entries. When the local controller receives the rules as part of its synchronization with the central controller upon restart, the local controller attempts to use the cached priority values when calculating the flow entries. Thus, if the flow entries that it calculates are the same as those on the MFE (so long as the rules have not changed, resulting in different match conditions), then the local controller will not have to provide new flow entries in an update to the MFE.

Similarly, when a rule is inserted within a set, in some embodiments the central controller provides this information to the local controller as a deletion of the rules after the inserted rule and an addition of the new rule and all of the deleted rules, which have been moved down one priority each. In some embodiments, the local controller caches the priority values assigned to the deleted rules, and when the addition of those rules is received, the priority allocator attempts to allocate the same priority values to the new rules that these rules had previously, so that the flow entries for the rules will not change (the new rule will still have to be added to the MFE, of course).

In addition, these examples illustrate the case in which all of these rules are evaluated in a single table of the flow-based MFE. However, in some cases (e.g., if there are too many rules to fit in one table, or too many rules to have adequate spacing between priority values) the controller will split the rules among multiple tables. In this case, the priority space effectively doubles, with the first half of the rules being assigned to a first table having priority values $\{0 \ldots X\}$ and a second table also having priority values $\{0 \ldots X\}$ which are effectively priority values $\{X+1 \ldots 2X+1\}$. In such cases, some embodiments use the start and end gaps for each table, so as to minimize the number of rules that need to move between tables for each update. This could also extend to more than two tables in some embodiments, if the number of rules is too large to fit within two tables.

II. Flow Entry Generation for Service Rules

Once the network controller assigns priority values to the rules, the controller then generates the configuration data for the MFE. For a flow-based MFE, this configuration data is flow entries used by the MFE to implement the service rules (as well as other aspects of the logical network). In the MFE of some embodiments, flow entries within a table (or sub-table) have priorities, such that if a packet matches more than one flow entry in a stage, the MFE will execute the actions of the highest-priority matching flow entry on the packet (thus the assignment of flattened priority values to the rules). Some embodiments use a single stage of flow entries for the service rules (i.e., with one flow entry per service rule), while other embodiments use multiple stages of flow entries.

Specifically, in some embodiments, the service rules include matches over multiple parameters. For example, the distributed firewall rules of some embodiments match over a source network address (e.g., MAC or IP address), destination network address, source transport layer port, and destination transport layer port. While a service rule can match over a single value for each parameter or multiple values for one or more of the parameters, the MFEs of some embodiments only use flow entries with a single value (or a bitmasked value for a port or IP prefix) for each parameter. Thus, multiple flow entries are required for service rules with multiple possible values for each parameter. As a simple example, a service rule with two possible values for a first parameter and one value for each of the other parameters will require two flow entries.

However, for service rules with large numbers of possible parameter values, this can lead to a massive number of flow entries. If a service rule has five possible source addresses, seven possible destination addresses, fifty possible source ports, and twenty-five possible destination ports, then simply taking the product of these parameters leads to 5*7*50*25=43,750 flow entries for a single service rule (although if the ports are in a contiguous range, then the number can potentially be lessened via bitmasking). To solve this problem, some embodiments use a conjunctive matching technique that matches over each parameter in a separate stage, and stores a conjunction value in a register when each parameter is matched. A last stage matches over this conjunction value if all of the parameters for the service rule were previously matched. In the example above, this would only require 5+7+50+25+1=88 flow entries, a significant savings. Conjunctive match techniques are described in greater detail in U.S. patent application Ser. No. 14/815,896, filed Jul. 31, 2015, now published as U.S. Patent Application Publication 2017/0034049, which is incorporated herein by reference.

A simple use of the conjunctive match technique is not without its problems, however. When there are many rules with overlapping parameter values, matching on the same set of addresses for many rules can create a large number of flow entries (even for single-dimensional rules that do not require conjunction). For example, if three rules match on the same set of one hundred source addresses, then this could result in 300 flow entries. However, if an initial stage was used to match each address to a separate identifier, then these three rules could each have a single flow entry matching on the separate identifier, for a total of 103 flow entries.

Thus, some embodiments use address set normalization to further simplify the set of flow entries to push to the MFE. Address set normalization, for each of the source and destination address parameters, identifies sets of addresses that are treated the same within all of the service rules, and groups these sets into non-overlapping groups that are each treated the same within the flow entries. For instance, if two source addresses are matched by the same five service rules, then these addresses can be assigned an identifier. Before the packet processing stage for matching source addresses, a packet will be processed through a stage that assigns the packet a group identifier based on its source address. The MFE then matches over this group identifier at the source address processing stage rather than matching over the actual address of the packet. In some embodiments, the non-conjunctive (single stage) flow entries are generated using the normalized address sets as well.

Figure 10:
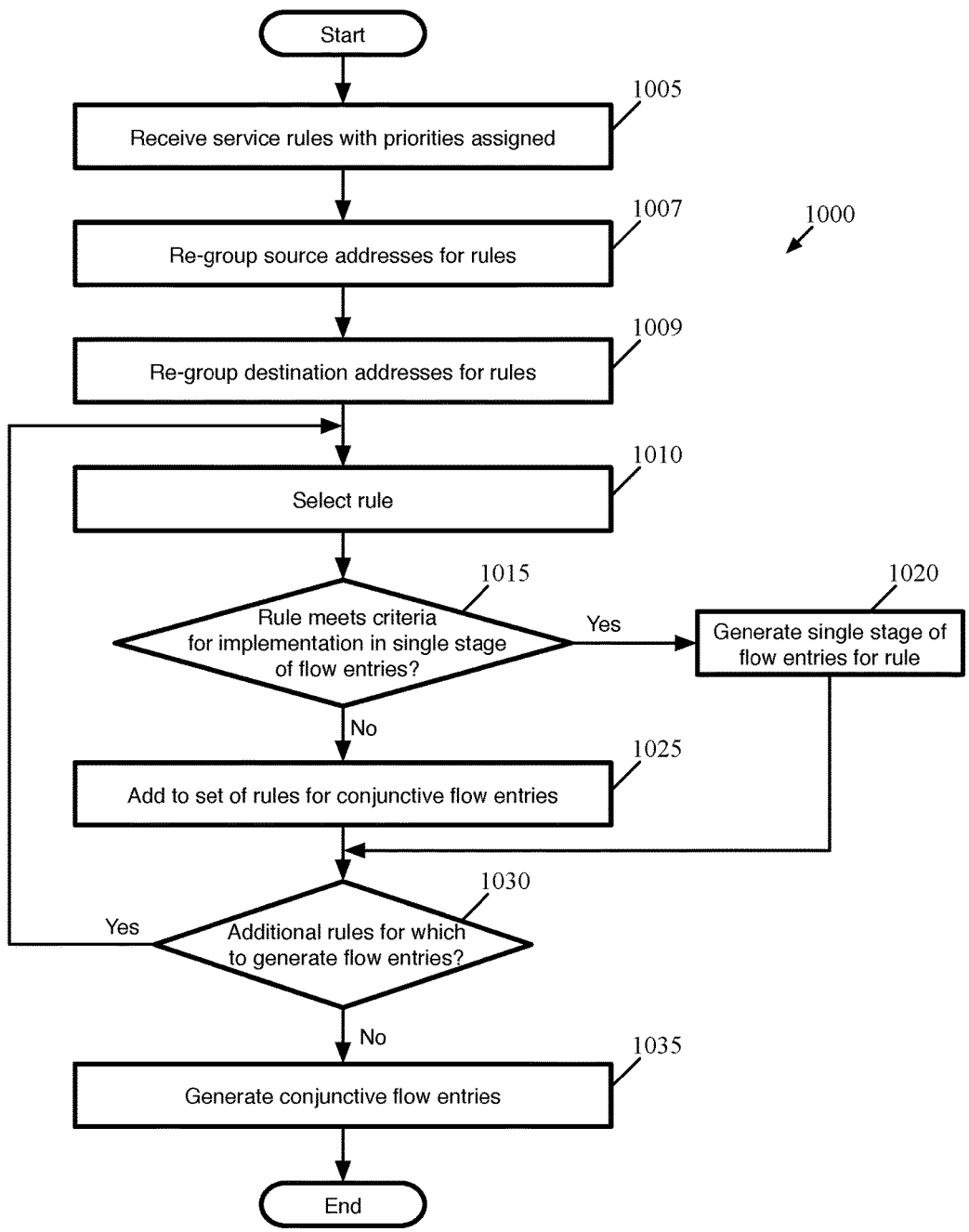
FIG. 10 conceptually illustrates a process of some embodiments for generating flow entries for a set of service rules.

FIG. 10 conceptually illustrates a process 1000 of some embodiments for generating flow entries for a set of service rules. In some embodiments, a network controller (e.g., a local controller that manages a single MFE on a host machine, a central controller that manages multiple MFEs on multiple host machines) performs the process 1000 both for an initial set of service rules (e.g., firewall rules) as well as for updates to the service rules. This process enables the use of both conjunctive and non-conjunctive flow entries for service rules depending on which will minimize the number of flow entries for each rule.

As shown, the process 1000 begins by receiving (at 1005) service rules with priorities assigned. In some embodiments, the service rules might belong to multiple rule sections, but have the priorities assigned in a flat list. For example, the priority values might have been assigned by a process such as that shown in FIG. 3 or, for updates (e.g., for flow entry re-assignment), the process shown in FIG. 6.

Once the controller has classified each of the service rules, the process re-groups (at 1007) the source addresses for the received rules and re-groups (at 1009) the destination addresses for the received rules. This process 1000 assumes that both source and destination addresses are used for the service rules, though in other embodiments different types of service rules might only have one or the other type of addresses (e.g., NAT rules might only be based on the source address and port, as an example). Furthermore, in other embodiments, other parameters may be subject to similar re-grouping operations. The details of this re-grouping process for a particular type of address (or other parameter) will be described in detail below.

After re-grouping the rules, the process 1000 then determines, for each rule, whether to generate flow entries for that rule using conjunctive match techniques or using a single stage flow entry. Specifically, the process selects (at 1010) a rule. Some embodiments select rules in priority order (e.g., starting at either the lowest or highest priority), while other embodiments use a random or other order. In addition, some embodiments perform these operations on multiple rules in parallel.

Next, the process determines (at 1015) whether the selected rule meets a set of criteria for implementation in a single stage of flow entries. Different embodiments may use different criteria, depending on the format of the service rules. In some embodiments, if at least two of the parameters have two or more possible matching values, then the controller implements the process using conjunctive match flow entries. For a more exact determinant, some embodiments calculate the sum of the numbers of possible matching values for each parameter and the product of the numbers of possible matching values for each parameter. When the sum is larger or the two computations are equal, then the controller uses a single stage of multiple flow entries. When the product is larger, the controller uses conjunctive match flow entries instead. For the address parameters, some embodiments use the number of normalized address groups as possible matching values, rather than the number of actual addresses that may match the parameter.

Irrespective of which specific criteria are used, when the rule meets the criteria for implementation in a single stage, the process generates (at 1020) a single stage of flow entries for the rule. For instance, a rule that has one possible source address (or address group), four possible destination addresses (or address groups), one source port, and one destination port will have four flow entries generated for its single stage, with each flow entry matching the same source address, source port, and destination port but a different one of the destination addresses. These flow entries, in some embodiments, would have the priority value assigned to the specific rule. In addition, in some embodiments, a stage of flow entries for the address set normalization would have been generated.

On the other hand, when the rule does not meet the criteria for implementation in a single stage, the process adds (at 1025) the rule to a set of rules from which to generate conjunctive flow entries. As described in more detail below, the flow entries for rules using conjunctive match are generated together in order to allow for address set normalization or other efficiencies in some embodiments.

Next, the process 1000 determines (at 1030) whether additional rules remain for which to generate flow entries (i.e., rules for which the controller has not decided whether to generate a single stage of flow entries or a set of multi-stage conjunctive flow entries). When additional rules remain, the process returns to 1010 to select the next such rule.

Otherwise, the process generates (at 1045) the multiple stages of conjunctive flow entries. In some embodiments, the flow entries will have a stage for each address grouping operation, a stage for each parameter of the service rules, and a conjunction stage. Thus, the firewall rules of some embodiments with source and destination address normalization, as well as source port and destination port stages, will have seven stages in total. Some embodiments use the priorities of the rules for only the final conjunction stage, which will also include the single-stage flow entries generated at 1025. The process 1000 then ends.

Figure 11:
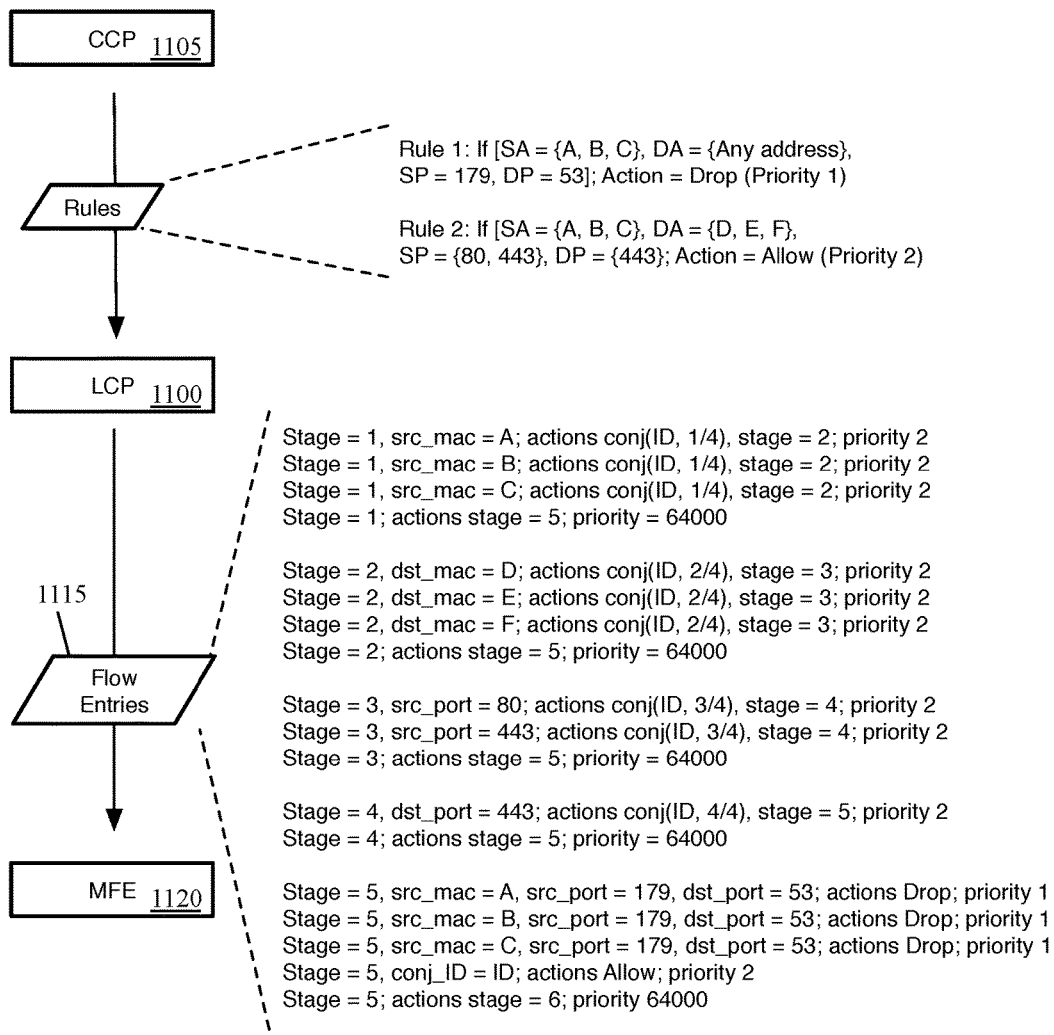
FIG. 11 conceptually illustrates an example of the flow entries generated for two distributed firewall rules, in which the controller generates a single stage of flow entries for one of the rules and conjunctive flow entries for the other.

FIG. 11 conceptually illustrates an example of the flow entries generated for two distributed firewall rules, in which the controller generates a single stage of flow entries for one of the rules and conjunctive flow entries for the other. As shown, in this example a central control plane 1105 (e.g., a central controller that implements the central control plane) pushes a set of rules 1110 (including at least the two rules shown) to a local controller 1100. The central control plane 1105, in some embodiments, pushes these rules 1110 to numerous local controllers that implement the logical network to which these rules belong. However, only the one local controller 1100 is shown in this figure.

The figure illustrates two rules sent by the central control plane 1105, though it should be understood that the set of rules 1110 might include many more rules than this. This set of rules might be a rules update adding two rules or an initial set of rules for a logical network. Specifically, the first rule is matched by a packet if (i) the source address of the packet is any of the set {A, B, C}, (ii) the source port of the packet is 179, and (iii) the destination port of the packet is 53, irrespective of the destination address (which is completely wildcarded for this rule). The rule specifies that such packets should be dropped. This rule is the highest priority in the set of rules 1110, which for simplicity are not shown as having multiple rule sections. The second rule is matched by a packet if (i) the source address of the packet is any of the set {A, B, C}, (ii) the destination address of the packet is any of the set {D, E, F}, (iii) the source port of the packet is any of the set {80, 443}, and the destination port of the packet is 443. This rule specifies to allow such packets, and the rule has the second highest priority in the set of rules 1110, which is a lower priority than the first rule.

Thus, the first rule requires three flow entries in a single stage (because only one parameter has multiple possible values), whereas the second rule requires conjunctive match flow entries (for a single stage, this rule would need eighteen flow entries). Thus, the local controller 1100 converts these rules 1110 into flow entries 1115 that are distributed to its local MFE 1120.

The figure also illustrates the nature of these flow entries, which are broken down into five stages. It should be understood that the actual flow entries for specific flow-based MFEs (e.g., Open vSwitch) may be slightly different than the flow entries shown in this figure. For instance, while the flow entries shown include a match on a "Stage" variable, in some embodiments these variables would be stored in a specific register field (e.g., "reg0" or "reg1"). Furthermore, the flow entries for the service rules would generally not start at stage 1, as typically there would have been a number of earlier stages in the processing of the packet. In addition, the flow entries shown are not specific to a logical network or logical forwarding element; in some embodiments, each flow entry would include a match over a logical network, logical forwarding element, and/or logical port UUID, so as to isolate these flow entries from similar flow entries for other logical networks implemented by the MFE 1120.

As shown, the flow entries 1115 generated by the LCP 1100 include separate stages for each of the parameters: source MAC address, destination MAC address, source port, and destination port, as well as a fifth stage for both the single stage flow entries of Rule 1 and the conjunction flow entries for Rule 2. In this case, address set normalization is not performed, so there is no introductory stage matching the addresses to the rules. Instead, the first stage includes a separate flow entry for each source MAC address. The actions if any of these three MAC addresses {A, B, C} are matched include a conjunction action indicating that for conjunctive flow "ID" the first of four stages is matched and incrementing the stage variable. In addition, these flow entries have priority 2. In addition, this stage (and each of the other stages) has a default action (very low priority) that specifies to advance directly to stage 5 if the packet does not match any of the source MAC addresses. The second stage has similar flow entries matching on the destination MAC addresses, with actions specifying that the second stage of the conjunctive flow "ID" has been matched. The third stage matches over the two source port values and the fourth stage matches over the one destination port value, with actions for indicating, respectively, that the third and fourth stages of the conjunctive flow "ID" are matched.

Lastly, the fifth stage includes the three flow entries for the first rule as well as a flow matching on the conjunction identifier "ID". This latter flow is matched only if all of the (four) stages of the conjunctive flow "ID" are matched, as described in greater detail in U.S. patent application Ser. No. 14/815,896, filed Jul. 31, 2015, which is incorporated by reference above. If the conjunction flow "ID" is matched, then the flow entry specifies to allow the packet. As shown, this rule has a priority of 2; whereas the priorities are less important in this case for the first four stages, the last stage is when the actual rules are matched, and thus the flow entries at this stage need to have the priority values assigned for the rules by the priority allocator.

The first three flow entries that implement the first rule have a priority of 1, so that even if the packet matches all of the parameters for the second rule, if it also matches one of the flow entries for the first rule then the MFE will treat that first-rule flow entry as having been matched at stage 5 (note that this is not possible in this case, but could happen in other examples). Each of these three flow entries matches on the same source port and destination port, but a different source MAC address, and specifies the same action (dropping the packet). Finally, this last stage also has a default flow entry with a low priority in case none of the rules are matched. This default flow entry may drop the packet, or as in this case simply proceed to the next stage.

As mentioned, the above example does not use address set normalization. When the network controller receives a large number of service rules to implement, there may be groups of addresses (source and/or destination) that are commonly grouped together within the rules. For instance, the administrator may have groups of VMs that should be treated similarly, and the set of MAC addresses (or IP addresses) for these VMs may have common treatment within the service rules. Thus, for each of the source and destination addresses, the groups of addresses may be partially or completely overlapping. In some embodiments, the network controller flattens the addresses, then identifies groups of addresses that are treated the same within the rules (for both the source and destination address parameters). The flow entries generated for the rule have an initial stage assigning an address group identifier to a packet based on the address of the packet (or two stages, for source and destination), then match over these identifiers within the single rule-matching stage or the conjunctive flow stages (depending on the type of rules received). In addition, for IP addresses (which may have different length prefixes), some embodiments flatten the IP addresses into a single prefix length so that a packet will not match multiple different IP addresses.

Figure 12:
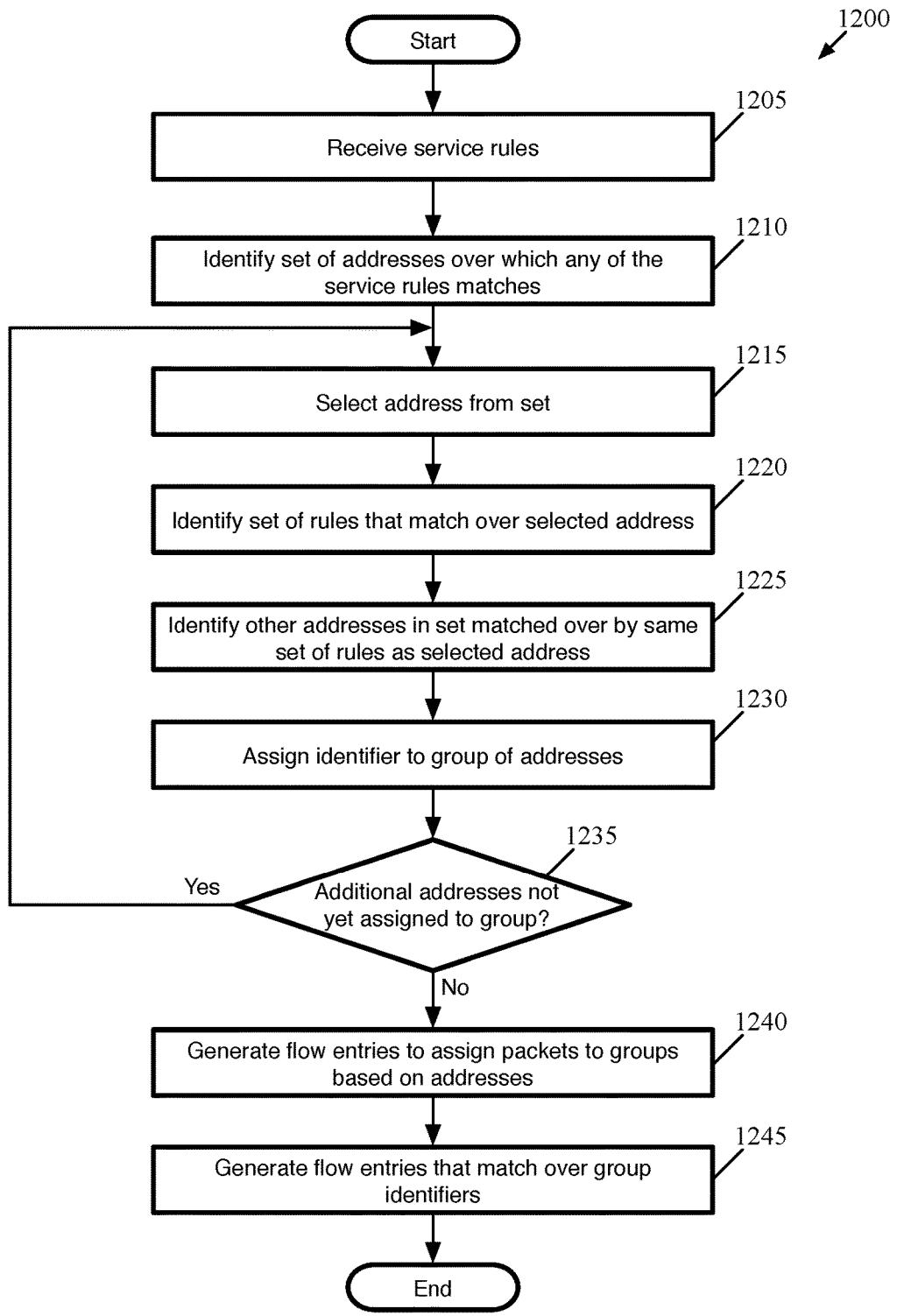
FIG. 12 conceptually illustrates a process of some embodiments for assigning addresses used as service rule matching parameters to non-overlapping groups.

FIG. 12 conceptually illustrates a process 1200 of some embodiments for assigning addresses used as service rule matching parameters to non-overlapping groups. In some embodiments, a network controller (e.g., a local controller that manages a single MFE or set of MFEs on a host machine, a central controller that manages multiple MFEs on multiple host machines) performs the process 1200 for an initial set of service rules, as part of generating flow entries for those service rules (e.g., at operations 1035 and 1040 of the process 1000). When rule updates are received that affect the groups, some embodiments perform this process or a similar process to update the groups and modify flow entries as necessary.

As shown, the process begins by receiving (at 1205) a set of service rules (e.g., distributed firewall rules). In some embodiments, these service rules will have priority values assigned and will have been narrowed down to only the rules for which conjunctive flow entries are generated, while in other embodiments the address set normalization is performed for all service rules prior to the determination of whether to use conjunctive flow entries or not (and in some embodiments, this subsequent determination is made based on the number of address groups for a rule parameter rather than the number of addresses). In addition, the overall set of service rules might include L2 rules that match on MAC addresses and L3 rules that match on IP addresses. In this case, the process 1200 (or a similar process) will be performed separately for each of these two rule sets (or four times, for both source and destination addresses for each of the L2 and L3 rules). That is, this process groups the values for one specific address parameter (or a non-address parameter, in some embodiments).

The process then identifies (at 1210) the set of addresses over which any of the service rules match. This can include addresses that dozens or hundreds of service rules include as a matching value for the address parameter or addresses matched by only a single rule. Some embodiments, to identify this flattened set of addresses, simply extract all values for the address parameter from the set of rules and remove duplicates. For MAC addresses, this is all that needs to be done.

However, for IP addresses, some embodiments perform additional preprocessing operations so as to remove overlapping prefixes. Because one prefix can contain another prefix, if the prefixes are not all of the same length, then packets could potentially match multiple IP address prefixes. One simple way to do this would be to use individual IP addresses (i.e., /32 addresses), but this could create thousands of addresses and thus create performance issues.

In some embodiments, the process extracts all of the addresses as given in the rules, which may be multiple different length prefixes. The process then, in addition to eliminating duplicates, compacts adjacent prefixes into larger prefixes within a single address set. As an example, 1.1.1.128/25 and 1.1.1.0/25 can be compacted into 1.1.1.0/24, as the addresses contained by the set {1.1.1.128/25, 1.110/25} are the same as those contained by 1.1.1.0/24. However, this should only be done for addresses in the same rule, not addresses given for two different rules.

The process then builds a binary trie from the remaining prefixes. This trie organizes the IP addresses with each node representing a prefix of length "/X" and having two child nodes for the two prefixes of length "/X+1" contained by that length "/X" prefix. If the trie only has leaf node values (i.e., all of the prefixes are the same length after compaction), then the pre-processing operation ends and these addresses can be used for the remainder of the process 1200. However, if the trie has nodes at multiple different levels, the process performs an in-order traversal of the trie, expanding each non-leaf node encountered. That is, for each node of length "/X", the process expands the node into its two child nodes of length "/X+1". If these nodes subsequently need to be expanded further, the traversal process will reach them and expand them into their four child nodes of length "/X+2" (two for each). One pass through the trie will push all address prefix values down to the leaf length.

In some embodiments, rather than expanding a node numerous subsequent times into two children, the process uses a more compact representation. Specifically, rather than having multiple levels of branching (e.g., 16 levels of branching from 10.0.0.0/8 to 10.0.0.0/24, some embodiments store all the leaves at the initial branching point itself. In this example, [10.128.0.0/9, 10.64.0.0/10, 10.32.0.0/11, 10.16.0.0/12, 10.8.0.0/13, 10.4.0.0//14, 10.2.0.0/15, 10.1.0.0/16, 10.0.128.0/17, 10.0.64.0/18, 10.0.32.0/19, 10.0.16.0/20, 10.0.8.0/21, 10.0.2.0/23, 10.0.1.0/24, and 10.0.0.0/24] would be the direct children of the 10.0.0.0/8 node. To avoid such a large amount of branching, however, some embodiments only use the traversal and expansion process for addresses that are of length "/24" or longer (i.e., "/25", "/26", etc.). Shorter addresses (that contain more individual addresses) are not grouped in this case, and the flow entries that match on the address parameter use these addresses (e.g., in combination with group identifiers for the longer prefixes).

Finally, the preprocessing replaces the prefixes in each address set with all the prefixes of the leaf length in that prefix's subtree within the trie, as the union of these prefixes will cover the same address range as that prefix. If the prefix was never split, then the subtree will be the prefix itself. Essentially, this process identifies the longest prefix (i.e., with the fewest bits wildcarded) and splits all other prefixes so that they have this same length.

Once the complete set of addresses have been identified, including any preprocessing for IP prefixes, the process 1200 can sort the addresses into non-overlapping groups. As shown, the process selects (at 1215) an address from the set. The addresses may be selected randomly, in rule order, in address order, etc. The process then identifies (at 1220) the set of rules that match over the selected address (for either source or destination, whichever parameter is being sorted). Some embodiments perform a simple check for each rule to determine whether the rule matches over the currently selected address, while other embodiments use other, quicker techniques.

Next, the process identifies (at 1225) other addresses in the set of addresses that are matched over by the same set of rules as the selected address. That is, a second address will be grouped together with the currently selected address if (i) all rules that match over the currently selected address also match over the second address and (ii) all rules that match over the second address also match over the currently selected address. If either address belongs to a rule to which the other does not belong, then the addresses will be in separate groups. Some embodiments identify the first rule that contains the address, identify each other address matched over by that first rule, and then determine whether the set of rules for each of these other addresses is the same. In some embodiments, for IP addresses, if two (or four, eight, etc.) address prefixes in the same group can be combined into a shorter prefix, the process performs this compaction. Other embodiments, however, do not perform such compaction.

The process then assigns (at 1230) an identifier to the group of addresses. This identifier will be used in the flow entries to represent the group of addresses. Different embodiments use different size identifiers; e.g., 8-bit identifiers, 16-bit identifiers, etc. The number of available identifiers should be at least as large as the number of addresses, in case each address ends up being treated separately.

In some cases, this address set normalization can use a great deal of memory, so some embodiments utilize techniques to save on memory. For example, a set of rules might have thousands (e.g., 20000, 30000, etc.) rules, with several thousand addresses. If all of these address sets are stored in memory at once, then the process could use many GBs of RAM in the worst cases. Thus, some embodiments do not store all of the flattened address sets at the same time. Instead, the process first builds the set of all addresses (i.e., the set identified by operation 1210). For each address A, the process then constructs an ordered set R(A) of the rules that match over A (i.e., the set of rules identified at 1220). Next, the process computes a hash H(A) (e.g., a fast cryptographic hash such as md5) over the elements of R(A), that is long enough to make the collision probability negligible. Once this hash is computed, the set of rules can be discarded, as the equality of hashes will serve to identify addresses that should be grouped together. Each H(A) can then be assigned a group identifier, to which the addresses are mapped.

Figure 13:
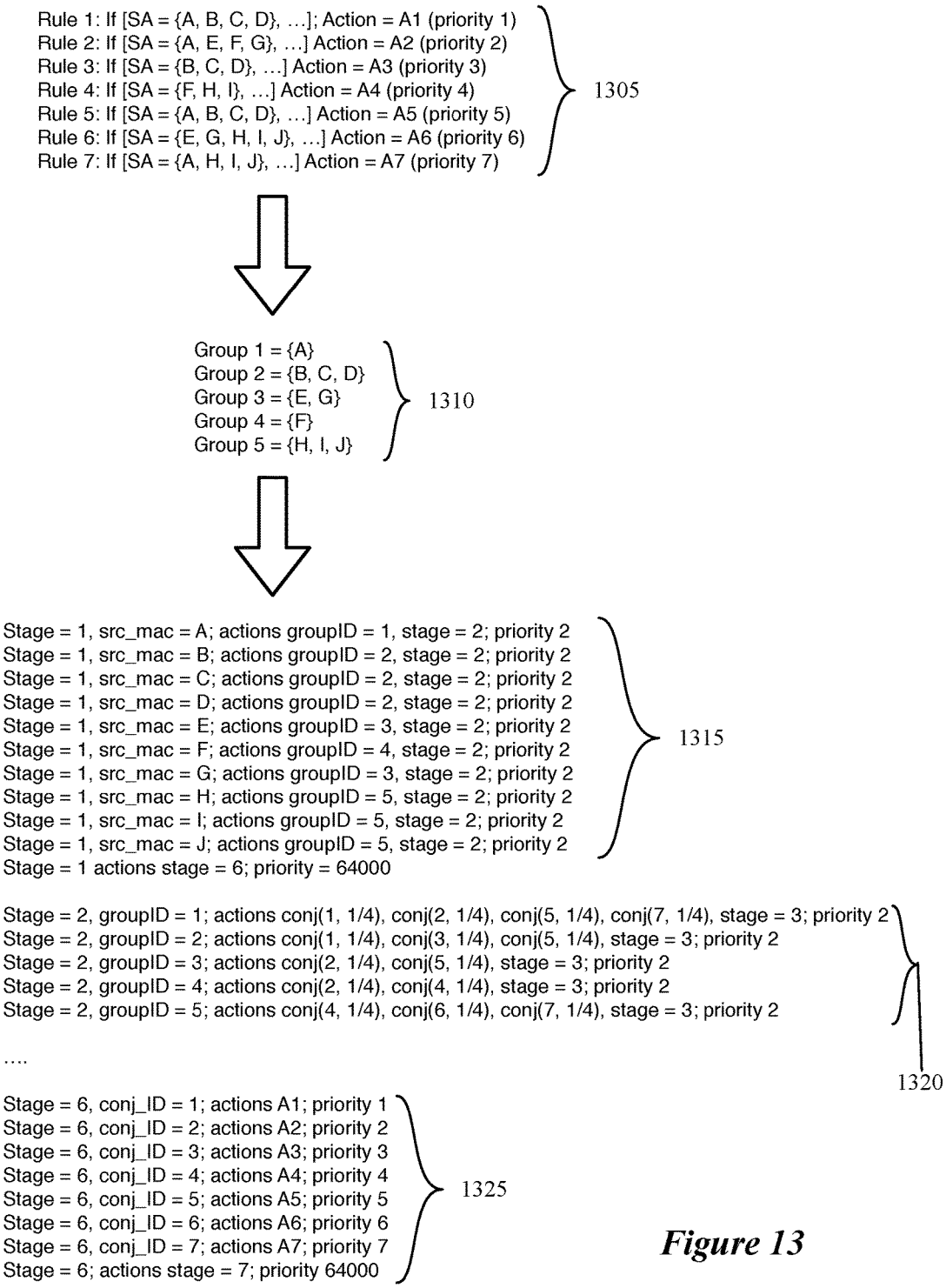
FIG. 13 conceptually illustrates an example of identifying address groups for the source addresses of a set of rules and the subsequent generation of flow entries for these rules.

FIG. 13 conceptually illustrates an example of identifying address groups for the source addresses of a set of rules and the subsequent generation of flow entries for these rules. As shown, a network controller receives a set of seven rules 1305, arranged from priority 1 (highest priority) to priority 7 (lowest priority). In this example, the entire rules are not shown; only the source address sets for each rule, and the sets of actions specified by each rule (A1-A7). The first rule matches over the source addresses {A, B, C, D}, the second rule matches over the source addresses {A, E, F, G}, the third rule matches over the source addresses {B, C, D}, the fourth rule matches over the source addresses {F, H, I}, the fifth rule matches over the source addresses {A, B, C, D}, the sixth rule matches over the source addresses {E, G, H, I, J}, and the seventh rule matches over the source addresses {A, H, I, J}. Thus, the flattened list of addresses includes a set of ten addresses.

The network controller groups these ten addresses into five groups 1310, as shown in the figure. The controller, performing process 1200, would identify that source address A is not matched over by the same set of rules as any other source address, and thus has a group of its own. The first rule also includes addresses B, C, and D, but these three addresses are all matched over by the third rule, which does not include address A. However, as shown, these three addresses are assigned to the same group (they are each matched over by rules 1, 3, and 5, and no other rules). Similarly, addresses E and G are assigned to a third group, address F is assigned to a fourth group on its own, and addresses H, I, and J are assigned to a fifth group.

Returning to FIG. 12, the process 1200 determines (at 1235) whether any additional addresses remain that have not yet been assigned to a group. Thus, in the example of FIG. 13, after address A is selected and then address B is selected (and assigned to a group with addresses C and D), six addresses would remain that could be selected. That is, even if an address is not selected at operation 1215, if the process assigns that address to a group, then it is removed from further consideration. If additional addresses remain, the process returns to 1215 to select the next address.

Once all of the addresses have been assigned to their respective groups, the process 1200 can generate the flow entries for the rules. The process generates (at 1240) flow entries to assign packets to groups based on the addresses of the packets. These flow entries will be a first stage, prior to the conjunctive flow stages. For this stage, the network controller generates one flow entry for each individual address in the set (or address prefix, for IP addresses). These flow entries match over the individual address and specify as an action to assign a variable the group identifier value associated with that address.

The process 1200 also generates (at 1245) flow entries that match over the group identifiers (rather than the individual addresses). For conjunctive flows, these flow entries include a stage for each parameter as well as a conjunction stage, but the stage(s) for the address parameter(s) matches over the group identifiers rather than the actual addresses. Similarly, for non-conjunctive (standard) flow entries, the matches for the grouped parameters (e.g., the addresses) will be over the group identifiers rather than the actual addresses. For stages the parameters of which are not regrouped (or for the corresponding match conditions in standard flow entries), the flow entries match over the parameter values from the packet (e.g., for ports). In some embodiments, however, other parameters (including ports) are regrouped using a normalization process similar to the process 1200. After generating the flow entries, the process 1200 ends.

FIG. 13 illustrates some of the flow entries 1315-1325 generated by a network controller for the service rules 1305. In this example, the controller generates conjunctive flow entries for all of the rules 1-7. The first stage of flow entries assigns address group identifier values to packets based on the source MAC address of the packet, using the groups 1310. For instance, three flow entries are generated such that if the MAC address of a packet is B, C, or D, then the packet will be assigned the value 2 for the groupID variable. In this case, eleven flow entries are required (one for each address, and one default flow entry that causes the packet to skip the conjunction stages if its source address does not match any of the addresses in any of the groups).

These group identifiers are used in the source address matching stage of the conjunctive flow entries 1320. As shown, only five flow entries are required for this stage. If a default flow entry is included, six flow entries will be generated, although the default flow entry in the first group of flow entries 1315 should ensure that only packets that will match one of the five flow entries 1320 will reach this stage. Each of these flow entries matches on the group identifier assigned to the packet at the previous stage. When a particular group identifier is matched, the flow entry specifies conjunction actions for each of the rules to which that group corresponds. Thus, for the first group (address A), the actions specify that the first parameter has been matched for conjunctions 1, 2, 5, and 7 (i.e., the first, second, fifth, and seventh rules). Similarly, for the second group (addresses B, C, and D), the actions specify that the first parameter has been matched for conjunctions 1, 3, and 5 (the first, third, and fifth rules). In the flow entries 1315 and 1320 for these first two stages, the priorities are all the same. This is because a packet can only match one possible flow entry at this stage, as there are no overlaps in the match conditions. In some embodiments, the flow entries at the first stage 1315 are not even assigned priorities, because each matches on a different value for the same parameter.

In other embodiments, however, separate flow entries are generated for each rule at the conjunctive stages, with the rule priority assigned to these separate flow entries. In some embodiments, the conjunction action requires that all of the conjunction stages have the same priority as the final stage that matches on the conjunction identifier, and thus require separate flow entries for each rule. FIG. 14 illustrates such separate flow entries 1400. For example, the first flow entry of the group of flow entries 1325 from the previous figure (that matches over the groupID value 1) is split into four flow entries, one for each of the conjunction actions. Similarly, the second and third flow entries (matching over groupID=2 and groupID=3, respectively) are split into three and two flow entries, etc. This means that (ignoring default actions) 24 flow entries are used in the address grouping and address matching stages, whereas 27 would have been required without the address grouping. While the savings in this example are small, on a scale with more uniform groupings and larger numbers of both rules and addresses, the flow entry savings will be larger. In addition, in the example of FIG. 13, when the conjunction actions can be grouped together into one flow entry, only 15 flow entries are required between the two stages.

Finally, FIG. 13 also shows the last stage of flow entries 1325. This stage contains one flow entry for each of the seven rules, arranged in priority order. If all of the conjunctive parameters have been matched for one of the rules, then its corresponding flow entry will be matched. They are arranged with the priority values of the rules, because a packet could (depending on the parameters for the rules) match multiple rules. If all of the conjunctive parameters for a particular rule are matched, the corresponding flow entry specifies to perform the actions for that rule. In addition, while only a standard default rule is shown, some embodiments might also include a rule for resubmitting the packet back to the earlier conjunctive stages, if some of the other parameters are not regrouped (and thus a packet could match a higher priority flow entry that specifies one of the conjunction identifiers, but would need to be resubmitted without that flow entry to match a lower priority flow entry that specifies a different conjunction identifier for the same parameter value). The resubmission through conjunctive stages is described in greater detail in U.S. patent application Ser. No. 14/815,896, filed Jul. 31, 2015, which is incorporated by reference above.

In addition to the features described above, some embodiments incorporate additional optimizations. For example, when creating a large number rules, an administrator might create rules that will never be matched by a packet (because all matching packets will also match a higher priority rule). Thus, some embodiments identify and eliminate such rules. One possible technique to perform this is to use a simplified headerspace analysis to identify, for each rule, whether any higher priority rules supersede the rule. Specifically, for each particular rule, some embodiments compute the union of the hypercubes defined by all of the higher priority rules (a hypercube being an expression of the matching parameter values), and if the hypercube for the particular rule is a subset of this union, then the rule can be eliminated.

Furthermore, some such embodiments use additional techniques to speed up the headerspace analysis processing. For each parameter, some embodiments start at the highest priority rule, and keep a running list of all possible values for that parameter. Each rule that adds at least one value to that list will clearly not be eliminated by the headerspace analysis, and is therefore marked as such. For these rules, the hypercube analysis need not be performed, although they still need to be added to the union used to determine whether to eliminate subsequent rules.

As another optimization, some embodiments identify rules that have a similar structure and can be grouped together into a single rule. As an example, an administrator might create several rules that match over the same set of destination addresses, source ports, and destination ports, and specify the same action (e.g., allow), but match over different source addresses. As long as they have consecutive priorities (or no rules that are intervening in the priority list could possibly also be matched), these rules can be merged into a single rule that matches over the set of source addresses (and same values for the other parameters), and then be treated as such for the priority allocation and flow generation.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
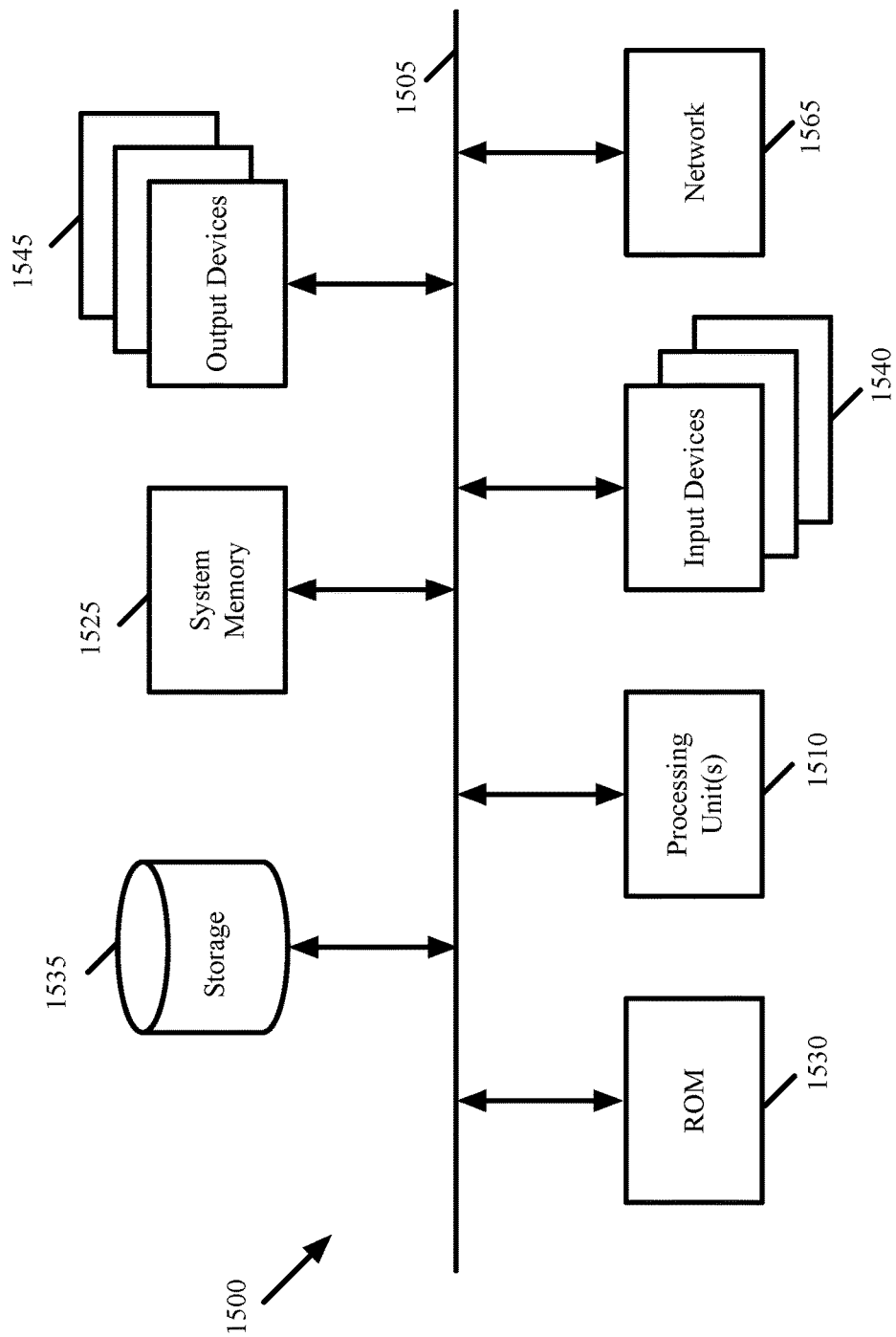
FIG. 15 conceptually illustrates an electronic system with which some embodiments of the invention are implemented.

FIG. 15 conceptually illustrates an electronic system 1500 with which some embodiments of the invention are implemented. The electronic system 1500 can be used to execute any of the control, virtualization, or operating system applications described above. The electronic system 1500 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieve instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash drive, etc.) as the permanent storage device. Like the permanent storage device 1535, the system memory 1525 is a read-and-write memory device. However, unlike storage device 1535, the system memory is a volatile read-and-write memory, such a random access memory. The system memory stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieve instructions to execute and data to process in order to execute the processes of some embodiments.

The bus 1505 also connects to the input and output devices 1540 and 1545. The input devices enable the user to communicate information and select commands to the electronic system. The input devices 1540 include alphanumeric keyboards and pointing devices (also called "cursor control devices"). The output devices 1545 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 3, 6, 10, and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. For a network controller that manages a flow-based managed forwarding element (MFE), a method comprising:
receiving a plurality of service rules for implementation by the MFE, wherein each service rule matches over a set of network addresses, wherein at least one network address is in the set of network addresses for at least two service rules;
grouping the network addresses into non-overlapping groups of network addresses, wherein each group of network addresses comprises addresses that are all matched by only a same set of service rules; and
generating flow entries that match over the groups of network addresses for the MFE to use to implement the service rules,
wherein said receiving, grouping, and generating is performed by the network controller, which is executed by a set of hardware processing units on a computer.

2. The method of claim 1, wherein the service rules are distributed firewall rules.

3. The method of claim 2, wherein each distributed firewall rule matches over a set of source network addresses, a set of destination network addresses, a set of source ports, and a set of destination ports.

4. The method of claim 1, wherein the network addresses are Internet Protocol (IP) addresses.

5. The method of claim 1, wherein the network addresses are Media Access Control (MAC) addresses.

6. The method of claim 1, wherein the set of network addresses are source addresses and each service rule additionally matches over a set of destination addresses, the method further comprising:
grouping the destination addresses into non-overlapping groups of destination addresses, wherein each group of destination addresses comprises destination addresses that are all matched by only a same set of service rules; and
generating flow entries for the MFE to use to implement the service rules that match over the groups of destination addresses.

7. The method of claim 6, wherein a particular network address is matched as a source address for a first rule and a destination address for a second rule.

8. The method of claim 1, wherein grouping the network addresses into non-overlapping groups comprises:
identifying all of the network addresses that belong to at least one of the sets of network addresses;
for each identified network address, determining a set of rules that match over the network address; and
when a same set of rules is determined for a first network address and a second network address, grouping the first and second network addresses together.

9. The method of claim 8, wherein grouping the network addresses into non-overlapping groups further comprises assigning an identifier to each group, the identifiers used to generate the flow entries.

10. The method of claim 1, wherein generating flow entries comprises:
generating a first stage of flow entries for mapping the network address of a packet to a group of network addresses; and
generating at least one additional stage of flow entries for mapping a packet to a highest-priority matching service rule.

11. The method of claim 10, wherein the additional stage of flow entries matches over an identifier for the group of network addresses.

12. The method of claim 10, wherein the additional stages of flow entries comprise a separate stage for each parameter over which the service rule maps, including the network addresses.

13. The method of claim 12, wherein the additional stages of flow entries use conjunctive matching.

14. The method of claim 1, wherein the network controller is a local controller that operates on a same physical machine as the MFE.

15. The method of claim 14, wherein both the local controller and the MFE operate within virtualization software of the physical machine.

16. The method of claim 14, wherein the local controller receives the plurality of service rules from a centralized controller, wherein the local controller is responsible for converting the plurality of service rules into a format useable by the MFE.

17. A non-transitory machine readable medium storing a network controller application which when executed by at least one processing unit manages a flow-based managed forwarding element (MFE), the network controller application comprising sets of instructions for:
receiving a plurality of service rules for implementation by the MFE, wherein each service rule matches over a set of network addresses, wherein at least one network address is in the set of network addresses for at least two service rules;
grouping the network addresses into non-overlapping groups of network addresses, wherein each group of network addresses comprises addresses that are all matched by only a same set of service rules; and
generating flow entries that match over the groups of network addresses for the MFE to use to implement the service rules.

18. The non-transitory machine readable medium of claim 17, wherein the service rules are distributed firewall rules that each matches over a set of source network addresses, a set of destination network addresses, a set of source ports, and a set of destination ports.

19. The non-transitory machine readable medium of claim 17, wherein the set of network addresses are source addresses and each service rule additionally matches over a set of destination addresses, the network controller application further comprising sets of instructions for:
grouping the destination addresses into non-overlapping groups of destination addresses, wherein each group of destination addresses comprises destination addresses that are all matched by only a same set of service rules; and
generating flow entries for the MFE to use to implement the service rules that match over the groups of destination addresses.

20. The non-transitory machine readable medium of claim 17, wherein the set of instructions for grouping the network addresses into non-overlapping groups comprises sets of instructions for:
identifying all of the network addresses that belong to at least one of the sets of network addresses;
for each identfied network address, determining a set of rules that match over the network address; and
when a same set of rules is determined for a first network address and a second network address, grouping the first and second network addresses together; and assigning an identifier to each group, the identifiers used to generate the flow entries.

21. The non-transitory machine readable medium of claim 17, wherein the set of instructions for generating flow entries comprises sets of instructions for:
generating a first stage of flow entries for mapping the network address of a packet to a group of network addresses; and
generating at least one additional stage of flow entries for mapping a packet to a highest-priority matching service rule.

22. The non-transitory machine readable medium of claim 17, wherein the network controller application is a local controller agent that executes within virtualization software of a same physical machine as the MFE.

23. The non-transitory machine readable medium of claim 22, wherein the plurality of service rules are received from a centralized controller, wherein the local controller is responsible for converting the plurality of service rules into a format useable by the MFE.

* * * * *